US009060536B2

(12) United States Patent
Hansen et al.

(10) Patent No.: US 9,060,536 B2
(45) Date of Patent: *Jun. 23, 2015

(54) SWEETENED CONSUMABLES COMPRISING REBAUDIOSIDE A AS A SWEETNESS ENHANCER AND METHOD OF ENHANCING SWEETNESS OF CONSUMABLES

(71) Applicant: Givaudan S.A., Vernier (CH)

(72) Inventors: Chad Allen Hansen, Kings Mills, OH (US); Jay Patrick Slack, Cincinnati, OH (US); Christopher Todd Simons, Wyoming, OH (US)

(73) Assignee: GIVAUDAN, S.A., Vernier (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,481

(22) Filed: Apr. 30, 2014

(65) Prior Publication Data
US 2014/0234511 A1    Aug. 21, 2014

Related U.S. Application Data

(63) Continuation of application No. 13/616,853, filed on Sep. 14, 2012, now Pat. No. 8,765,205, which is a continuation of application No. 13/585,009, filed on Aug. 14, 2012, now Pat. No. 8,679,567, which is a continuation of application No. 12/444,754, filed as application No. PCT/CH2007/000521 on Oct. 22, 2007, now abandoned.

(60) Provisional application No. 60/853,813, filed on Oct. 24, 2006.

(51) Int. Cl.
*A23L 1/236* (2006.01)
*A23L 1/09* (2006.01)
*A23L 2/60* (2006.01)
*C13B 50/00* (2011.01)
*A23L 1/30* (2006.01)

(52) U.S. Cl.
CPC .................. *A23L 1/2363* (2013.01); *A23L 1/09* (2013.01); *A23L 1/097* (2013.01); *A23L 1/236* (2013.01); *A23L 1/2366* (2013.01); *A23L 1/3002* (2013.01); *A23L 2/60* (2013.01); *A23V 2002/00* (2013.01); *A23L 1/2364* (2013.01)

(58) Field of Classification Search
CPC ......... A23L 1/236; A23L 1/2363; A23L 2/60; A23L 1/09; C13B 50/00; C13B 50/002
USPC .................................................. 426/548, 590
See application file for complete search history.

(56) References Cited

U.S. PATENT DOCUMENTS

| | | |
|---|---|---|
| 2,766,145 A | 10/1956 | O'Brien |
| 2,766,148 A | 10/1956 | Rowland |
| 3,344,796 A | 10/1967 | Yamaji et al. |
| 3,857,962 A | 12/1974 | Westall et al. |
| 4,219,571 A | 8/1980 | Miyake |
| 4,361,697 A | 11/1982 | Dobberstein et al. |
| 4,402,990 A | 9/1983 | DuBois |
| 4,404,367 A | 9/1983 | Stephenson et al. |
| 4,454,290 A | 6/1984 | DuBois |
| 4,495,170 A | 1/1985 | Beyts et al. |
| 4,497,835 A | 2/1985 | Winston |
| 4,612,942 A | 9/1986 | Dobberstein et al. |
| 5,433,965 A | 7/1995 | Fischer |
| 6,255,557 B1 | 7/2001 | Brandle |
| 6,255,558 B1 | 7/2001 | Haseloff et al. |
| 6,368,651 B1 | 4/2002 | Gerlat |
| 6,413,558 B1 | 7/2002 | Weber et al. |
| 6,461,659 B1 | 10/2002 | Zhou |
| 6,599,534 B2 | 7/2003 | Felisaz |
| 7,267,835 B2 | 9/2007 | Kitazume et al. |
| 7,579,032 B2 | 8/2009 | Lee et al. |
| 7,807,206 B2 | 10/2010 | Magomet et al. |
| 2002/0132037 A1 | 9/2002 | Zhou |
| 2002/0197371 A1 | 12/2002 | Lee et al. |
| 2003/0108627 A1 | 6/2003 | Selzer et al. |
| 2003/0138538 A1 | 7/2003 | Kitazume et al. |
| 2004/0022914 A1 | 2/2004 | Allen |
| 2007/0009638 A1 | 1/2007 | Takemori et al. |
| 2009/0280232 A1 | 11/2009 | Lee et al. |
| 2010/0112171 A1 | 5/2010 | Abelyan et al. |
| 2010/0227034 A1 | 9/2010 | Purkayastha et al. |
| 2011/0160311 A1 | 6/2011 | Prakash et al. |

FOREIGN PATENT DOCUMENTS

| | | |
|---|---|---|
| EP | 0920861 A | 6/1999 |
| EP | 1295533 A1 | 3/2003 |
| EP | 1673986 A2 | 6/2006 |
| JP | 52-083731 | 7/1977 |
| JP | 56-042560 A | 4/1981 |
| JP | 58-149655 A | 9/1983 |
| JP | 58-149655 A2 | 9/1983 |

(Continued)

OTHER PUBLICATIONS

S. S. Schiffman et al., "Investigation of Synergism in Binary Mixtures of Sweeteners", XP-002428872, Brain Research Bulletin, 1995, vol. 38, No. 2, pp. 105-120, Elsevier Science Ltd., USA.

(Continued)

Primary Examiner — Michele L Jacobson
Assistant Examiner — Jeffrey Mornhinweg
(74) Attorney, Agent, or Firm — Curatolo Sidoti Co., LPA; Joseph G. Curatolo; Salvatore A. Sidoti

(57) ABSTRACT

Disclosed are sweetened consumables and methods of forming said sweetened consumables that comprise certain sweeteners and at least one sweetness enhancer in a concentration near its sweetness detection threshold. The sweeteners include sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof. The sweetness enhancer is selected from naringin dihydrochalcone, mogroside V, swingle extract, rubusoside, rubus extract, rebaudioside, and stevioside.

16 Claims, No Drawings

(56) References Cited

FOREIGN PATENT DOCUMENTS

| JP | 08-000214 A | 1/1996 |
| JP | 09-194370 A | 7/1997 |
| JP | 10-191944 A | 7/1998 |
| JP | 10-262599 | 10/1998 |
| JP | 10-276712 | 10/1998 |
| JP | 11-346708 | 12/1999 |
| JP | 2000-041639 A | 2/2000 |
| JP | 2001-120218 | 5/2001 |
| JP | 2002-034501 | 2/2002 |
| JP | 2003-164268 | 6/2006 |
| WO | WO 91/03147 A2 | 3/1991 |
| WO | WO 9418855 A1 | 9/1994 |
| WO | WO 99/34689 A1 | 7/1999 |
| WO | WO 02/087358 A1 | 11/2002 |
| WO | WO 2006/072879 A1 | 7/2006 |

OTHER PUBLICATIONS

Jan H.A. Kroeze, "Neohesperidin Dihydrochalcone is Not a Taste Enhancer in Aqueous Sucrose Solutions", Chem. Senses, 2000, vol. 25, pp. 555-559.

S. S. Schiffman et al., "Synergism among Ternary Mixtures of Fourteen Sweeteners", Chem. Senses, 2000, vol. 25, pp. 131-140.

S. S. Schiffman et al., "Time to maximum sweetness intensity of binary and ternary blends of sweeteners", Food Quality and Preference, 2006, Elsevier Science Ltd., USA.

Kinghorn, Douglas A., et al., "Stevia, the genus stevia", Taylor and Francis, London, 2002, pp. 1-17, 178-193.

Kinghorn, Douglas A., et al., "Less Common High-Potency Sweeteners", Food Science and Technology, 2001, pp. 209-233.

Rompp, Encyclopedia "CHEMIE", $10^{th}$ Edition, 1998, pp. 4302-4304.

Wang, et al., "Evaluation of Sweeteners and Flavour Mixes containing Acesulfame K and Other Sweeteners", Food Science, 1994.

PCT/CH2007/000521—International Search Report, Feb. 25, 2008.

PCT/CH2007/000521—Written Opinion of the International Searching Authority, Feb. 25, 2008.

PCT/CH2007/000521—International Preliminary Report on Patentability, Apr. 28, 2009.

Geitz, Holger, Opposition to European Patent Application 2 079 319, Oct. 4, 2011.

Cargill Incorporated, Opposition to European Patent Application 2 079 319, Oct. 5, 2011.

Vossius, Third Party Observation Submitted in Opposition to European Patent Application 2 079 319, Sep. 20, 2012.

Kinghorn, A. Douglas and Soejarto, Djaja D., "Current Status of Stevioside as a Sweetening Agent for Human Use", Economic and Medicinal Plant Research, 1985, Academic Press, Inc., Orlando, Florids, Chapter 1, pp. 2-52.

Nabors, Lyn O'Brien, "Alternative Sweeteners", 2001, Marcel-Dekker Inc., New York, New York, Chapter 1, pp. 1-12.

Amano Enzyme Company, "Processing of starch", www.amano-enzyme.co.jp/eng/productuse/strach.html, Sep. 5, 2012.

Goto, Airton and Clemente, Edmar, "Influence of the Solubility Rebaudioside A and Stevioside", Ciencia E Tecnologia De Alimentos, vol. 18, No. 1, pp. 1-8, Apr. 30, 1998.

SWEETENED CONSUMABLES COMPRISING REBAUDIOSIDE A AS A SWEETNESS ENHANCER AND METHOD OF ENHANCING SWEETNESS OF CONSUMABLES

CROSS REFERENCE TO RELATED APPLICATIONS

The present application is a continuation of co-pending U.S. Ser. No. 13/616,853, filed Sep. 14, 2012, which is a continuation of U.S. Ser. No. 13/585,009, filed Aug. 14, 2012, now U.S. Pat. No. 8,679,567 B2, and U.S. Ser. No. 12/444,754, now abandoned, which is a 371 of PCT/CH07/000521, filed Oct. 22, 2007, having a 371(c) date of Apr. 8, 2009, which claims the benefit of the filing date under 35 U.S.C. §119(e) of U.S. Provisional Application for Patent Ser. No. 60/853,813, filed Oct. 24, 2006, each of which are incorporated herein by reference.

TECHNICAL FIELD

Disclosed are sweetened consumables and methods of forming said sweetened consumables that comprise certain sweeteners and at least one sweetness enhancer in a concentration near its sweetness detection threshold.

BACKGROUND

The sweetness enhancers used herein are known as natural and artificial sweeteners, however, they are used herein in a much lower concentration near their sweetness detection threshold.

These sweetness enhancers include Naringin dihydrochalcone (NarDHC), mogroside V or swingle extract comprising mogroside V, rubusoside or rubus extract comprising rubusoside, stevioside, and rebaudioside A.

Naringin dihydrochalcone has been used as a sweetener in concentrations well above its sweetness detection level. It has also been used in combination with stevioside to reduce the off-note of stevioside (JP10276712).

Swingle (also known as Lou Han Gou (LHG)) contains various naturally-derived terpene glycosides, in particular various mogrosides including mogroside IV, mogroside V, siamenoside I, and 11-oxo mogroside V. A swingle/LHG juice based sweetening system that provides a reduced sweet or unpleasant aftertaste is disclosed in U.S. Pat. No. 5,433,965 and WO 94/18855 by Fischer et al.

Rubus extract contains rubusoside and is used at a concentration well above its sweetness detection level as a sweetener and in combination with sugars. Sweetener compositions of various terpene glycosides including mogrosides and rubusoside at 0.1% to 10% by weight (1,000 ppm-100,000 ppm) are disclosed in US20020132037.

The sweet terpene glycoside stevioside and rebaudioside A have been used in mixtures with sugars including sucrose at above sweetness detection threshold (Schiffman et al., Chem. Senses 2000, 131-140, Schiffman et al., Brain Res. Bull., 1995, 105-120, Schiffman et al., Food Qual. And Pref. 2006 (internet pre-publication)).

Applicant has found that certain known sweeteners, namely mogroside V/swingle extract, rubusoside/rubus extract, and naringin dihydrochalcone (NarDHC), are sweetness enhancers and can be used in a low concentration near their sweetness detection threshold in combination with certain sweeteners, including certain artificial sweeteners, including in particular the sugars sucrose, fructose, glucose, high fructose corn syrup (containing fructose and glucose), xylose, arabinose, and rhamnose, the sugar alcohols erythritol, xylitol, mannitol, sorbitol, and inositol, and the artificial sweeteners AceK, aspartame, neotame, sucralose, and saccharine, to enhance the sweetness of said sweeteners.

None of these sweetness enhancers has been previously used near its sweetness detection threshold, alone or in combination, to enhance the sweetness of the above-mentioned sweeteners.

SUMMARY

In a first aspect, there is provided a sweetened consumable comprising
a) at least 0.0001% of at least one sweetener,
   wherein said sweetener includes sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof,
   wherein said at least one sweetener or sweetener combination is present in a concentration above the sweetness detection threshold in a concentration at least isosweet to 2% sucrose, and
b) at least one sweetness enhancer selected from the group consisting of naringin dihydrochalcone, mogroside V, swingle extract, rubusoside, rubus extract, stevioside, and rebaudioside A,
   wherein each sweetness enhancer is present in a concentration near its sweetness detection threshold, and wherein for naringin dihydrochalcone this concentration is from 2 to 60 ppm; for rubusoside, from 1.4 to 56 ppm; for rubus extract, from 2 to 80 ppm; for mogroside V, from 0.4 to 12.5 ppm; for swingle extract, from 2 to 60 ppm; for stevioside, from 2 to 60 ppm; and for rebaudioside A, from 1 to 30 ppm.

In another aspect, there is provided a sweetened consumable as described herein comprising naringin dihydrochalcone as a sweetness enhancer.

In another aspect, there is provided a sweetened consumable as described herein comprising rubusoside or rubus extract as a sweetness enhancer.

In another aspect, there is provided a sweetened consumable as described herein comprising mogroside V or swingle extract as a sweetness enhancer.

In another aspect, there is provided a sweetened consumable as described herein comprising rebaudioside A as a sweetness enhancer.

In another aspect, there is provided a sweetened consumable as described herein comprising stevioside as a sweetness enhancer.

In another aspect, there is provided a sweetened consumable as described herein comprising two of the sweetness enhancers.

In another aspect, there is provided a sweetened consumable as described herein comprising a second sweetness enhancer selected from the group consisting of mogroside V, swingle extract, rubusoside, rubus extract, rebaudioside A, stevioside.

In another aspect, there is provided a sweetened consumable as described herein comprising three of the sweetness enhancers.

In another aspect, there is provided a sweetened consumable as described herein additionally comprising NDHC in a concentration from 1 to 5 ppm.

In another aspect, there is provided a sweetened consumable as described herein which is a beverage.

In another aspect, there is provided a beverage as described herein additionally comprising neohesperidin dihydrochalcone in a concentration from 1 to 2 ppm.

In another aspect, there is provided a method of sweetening consumables utilizing at least 0.0001% of at least one sweetener, wherein said sweetener includes sucrose, fructose, glucose, high fructose corn syrup, corn syrup, xylose, arabinose, rhamnose, erythritol, xylitol, mannitol, sorbitol, inositol, acesulfame potassium, aspartame, neotame, sucralose, saccharine, or combinations thereof, and at least one sweetness enhancer selected from the group consisting of naringin dihydrochalcone, mogroside V, swingle extract, rubusoside, rubus extract, rebaudioside A and stevioside, wherein each sweetness enhancer is present in a concentration near its sweetness detection threshold, and wherein for naringin dihydrochalcone this concentration is from 2 to 60 ppm; for rubusoside, from 1.4 to 56 ppm; for rubus extract, from 2 to 80 ppm; for mogroside V, from 0.4 to 12.5 ppm; for swingle extract, from 2 to 60 ppm; for stevioside, from 2 to 60 ppm; and for rebaudioside A, from 1 to 30 ppm are admixed to a consumable.

DETAILED DESCRIPTION

The sweetness detection threshold for the sweetness enhancers and their combinations were determined by the applicant.

The sweetness detection threshold varies somewhat in different individuals. For example, some individuals are able to detect the sweetness of sucrose in a very low concentration of 0.4%, others need at least 0.7% or even more. All examples were performed with sweet sensitive panelists able to detect at least 0.5% of sucrose or less. The concentration detectable by the average consumer will therefore be higher.

A sweetness enhancer's sweetness detection threshold is defined herein as a concentration with an isointensity to sucrose of up to 1.25% sucrose or lower, for example, up to 1% sucrose, up to 0.8%, up to 0.75%, up to 0.7% sucrose, or up to 0.5% sucrose, as detected by sweet sensitive panelists.

Examples of useful concentration ranges near the sweetness detection threshold of sweetness enhancers are indicated below:

2 to 60 ppm NarDHC.

1.4 to 42 ppm rubusoside or 2 to 60 ppm rubus extract.

0.4 to 12.5 ppm mogroside V or 2 ppm to 60 ppm swingle extract.

2 to 60 ppm stevioside.

1 to 30 ppm rebaudioside A.

Further useful concentrations for rubus extract may be, for example, from 2 ppm to up to 80 ppm. Further useful concentrations for rubusoside may be, for example, from 2 ppm to up to 56 ppm.

Combinations of these sweetness enhancers with each other and with optional ingredients were found to have a particularly high sweetness enhancing effect on a sweetener as described herein.

For example, the following mixtures were found to perform well:

NarDHC (10 to 60 ppm)+extract swingle (10 to 60 ppm).
NarDHC (45 ppm)+swingle extract (45 ppm).
NarDHC (45 ppm)+swingle extract (60 ppm).
NarDHC (60 ppm)+swingle extract (45 ppm).
NarDHC (60 ppm)+swingle extract (60 ppm).

Alternatively to swingle extract, NarDHC may be combined with mogroside V, rubusoside, rebaudioside A, or stevioside in concentrations near their sweetness detection threshold.

The above mixtures may be further enhanced by addition of optional ingredients, for example neohesperidin dihydrochalcone (NDHC). The following mixtures were found to perform well:

NarDHC (10 to 60 ppm)+extract swingle (10 to 60 ppm)+NDHC (1 to 2 ppm).
NarDHC (60 ppm)+Swingle extract (60 ppm)+NDHC (2 ppm).
NarDHC (60 ppm)+Swingle extract (45 ppm)+NDHC (2 ppm).
NarDHC (45 ppm)+Swingle extract (45 ppm)+NDHC (1.5 ppm).
NarDHC (30 ppm)+Swingle extract (30 ppm)+NDHC (1 ppm).

Alternatively to swingle extract, mogroside V, rubusoside, rubus extract, rebaudioside A, or stevioside, may be used in the mixtures including NDHC above.

The determined isointensities to sucrose solutions of the sweetness enhancers are indicated below:

60 ppm rubus extract with 42 ppm rubusoside is below the intensity of 1% sucrose.
60 ppm swingle extract with 12.48 ppm mogroside V is isosweet to 0.75% sucrose.
45 ppm NarDHC is isosweet to 0.5% sucrose.
60 ppm NarDHC is isosweet to 1.25% sucrose.
20 ppm rebaudioside A is isosweet to 0.75% sucrose.
30 ppm stevioside is isosweet to 0.5% sucrose.
40 ppm stevioside is isosweet to 0.75% sucrose.

The sweeteners include, but are not limited to, the sugars sucrose, fructose, glucose, high fructose corn syrup (containing fructose and glucose), xylose, arabinose, and rhamnose, the sugar alcohols erythritol, xylitol, mannitol, sorbitol, and inositol, and the artificial sweeteners AceK, aspartame, neotame, sucralose, and saccharine, and combinations of these sweeteners.

Sucrose, also known as table sugar or saccharose, is a disaccharide of glucose and fructose. Its systematic name is α-D-glucopyranosyl-(1→2)-β-D-fructofuranose. Fructose and glucose are monosaccharide sugars.

High fructose corn syrup (HFCS) consists of a mixture of glucose and fructose. Like ordinary corn syrup, the high fructose variety is made from corn starch using enzymes. The fructose content of corn syrup (glucose) is increased through enzymatic processing. Common commercial grades of high fructose corn syrup include fructose contents of 42%, 55%, or 90%. The 55% grade is most commonly used in soft drinks.

Erythritol (systematic name 1,2,3,4-butanetetrol) is a natural non-caloric sugar alcohol.

AceK, aspartame, neotame and sucralose are artificial sweeteners.

Acesulfam potassium (AceK) is the potassium salt of 6-methyl-1,2,3-oxathiazine-4(3H)-one 2,2-dioxide, an N-sulfonylamide. It is also known as Acesulfam K or AceK, or under various trademark names including Sunett® and Sweet One®. In the European Union it is also known under the E number (additive code) E950.

Aspartame is the name for aspartyl-phenylalanine-1-methyl ester, a dipeptide. It is known under various trademark names including Equal®, and Canderel®. In the European Union, it is also known under the E number (additive code) E951.

Sucralose is the name for 6-dichloro-1,6-dideoxy-β-D-fructo-furanosyl 4-chloro-4-deoxy-α-D-galactopyranoside, which is a chlorodeoxysugar. It is also known by the trade name Splenda®. In the European Union, it is also known under the E number (additive code) E955.

The natural sweeteners may be used in pure or partly purified form, and may be chemically synthesised, produced by biotechnological processes including fermentation, or isolated from a natural source, in particular a botanical source (including, without limitation, fruits, sugar cane, sugar beet), for example a plant extract or syrup including, without limitation, corn syrup, high fructose corn syrup, honey, molasses, maple syrup, fruit concentrates, and other syrups and extracts.

The sweetness enhancers and some of their synonyms and plant sources are listed below.

Naringin dihydrochalcone (NarDHC) is also known as [4-[[2-O-(6-Deoxy-L-mannopyranosyl)-D-glucopyranosyl]oxy]-2,6-dihydroxyphenyl]-3-(4-hydroxyphenyl)-1-propanone. The chemical structure is given below.

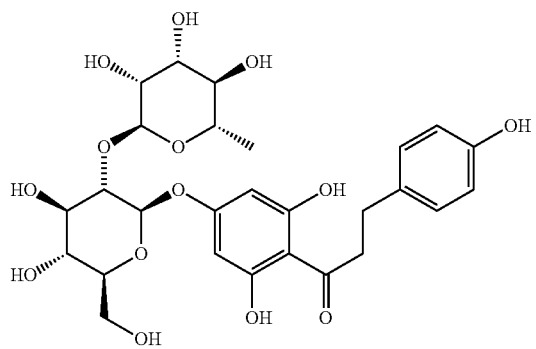

Swingle extract is also known as swingle, Lo Han, Lo Han Guo, or Lo Han Gou. Swingle extract contains mogrosides and can be extracted from the plant *Siraitia grosvenorii*. *Siraitia grosvenorii* (syn. *Momordica grosvenorii*, *Thiadiantha grosvenorii*); also called arhat fruit or longevity fruit; or in simplified Chinese luó hàn guǒ or luo han kuo. The plant contains mogrosides, a group of triterpene glycosides that make up approximately 1% of the flesh of the fresh fruit. Through extraction an extract in the form of a powder containing 80% mogrosides can be obtained. Mogroside extract contains mogroside V (major active), mogroside IIa, mogroside IIb, mogroside III, mogroside IV, 11-oxo mogroside V, and siamenoside I.

The structure of mogroside V is given below:

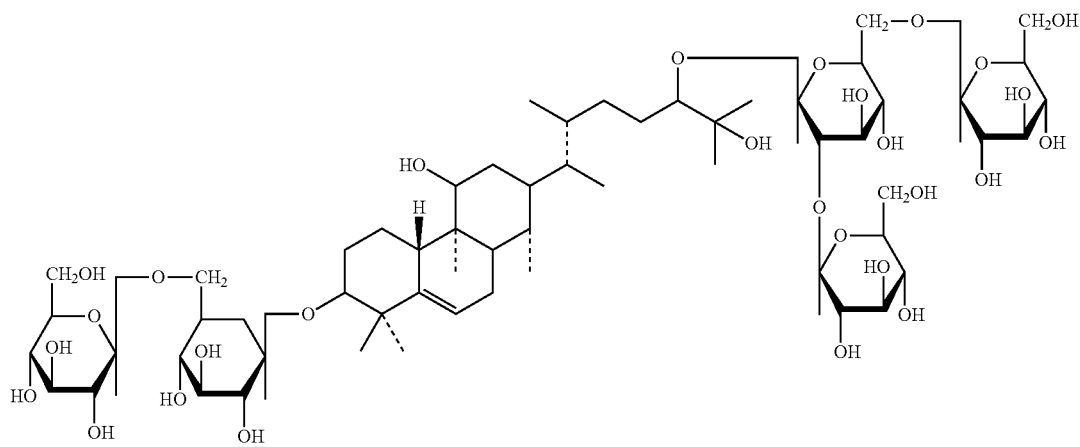

Rubus extract is the extract of the plant *Rubus suavissimus* and contains rubusoside. Rubusoside may be purified from the extract and used in purified form or the extract may be used. Alternatively to *Rubus suavissimus* extract, another botanical extract containing a sufficient amount of rubusoside may be used. The chemical structure of rubusoside is given below.

Alternatively to swingle extract, another botanical extract containing a sufficient amount of mogroside V may be used.

Stevioside is a terpenoid glycoside also known as stevia, and is found in extracts of the plant *Stevia rebaudiana*.

Rebaudioside A is a terpenoid glycoside that is found in extract of *Stevia rebaudiana*. The chemical structure is given below.

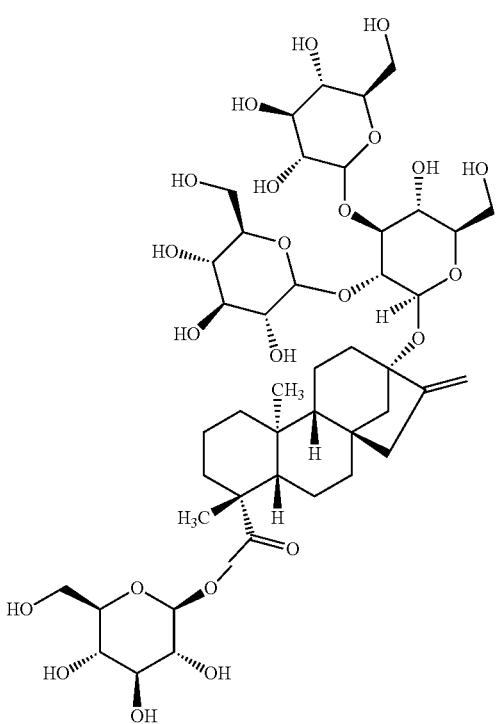

The sweetness enhancers can be used in purified or isolated form or in the form of a botanical extract comprising the sweetness enhancing actives.

The sweetness enhancers can be used as a single sweetness enhancing component in a concentration as indicated below in a formulation containing 0.0001 to 15% (wt/wt) or more of at least one sweetener. A useful concentration for a sweetener is a concentration that on its own provides an isointensity to a sucrose solution of at least 2%, for example 2% to 15%, or 5% to 12%.

For example, a useful concentration of sucrose, fructose, glucose, high fructose corn syrup (HFCS) or erythritol may be from about 5% to about 12%.

One or more sweetness enhancers as defined-herein may be mixed with optional ingredients, in particular ingredients selected from Neohesperidin dihydrochalcone (NDHC), and stevioside. A useful concentration for NDHC is 1 to 5 ppm. Stevioside may be added in a concentration of, for example, 10-100 ppm.

Neohesperidin dihydrochalcone (NDHC, E959) is a known sweetness enhancer of sucrose and/or stevioside, though its effectiveness at its sweetness detection threshold for sucrose is disputed. For example, Kroeze et al., Chem. Senses 2000, 25, 555-559 disclose that NDHC does not enhance sucrose sweetness at its sweetness detection threshold.

If rubus extract, rubusoside, swingle extract, mogroside V, rebaudioside A or stevioside are mixed with NDHC, the enhancement effect remains more than additive (a suppression effect has been described for many sweeteners), and NDHC even further enhances the sweetness.

The sweetness enhancers can be added to consumables to enhance the sweetness of sweeteners herein described present in said consumables or added to such consumables.

Consumables include all food products, including but not limited to, cereal products, rice products, tapioca products, sago products, baker's products, biscuit products, pastry products, bread products, confectionery products, desert products, gums, chewing gums, chocolates, ices, honey products, treacle products, yeast products, baking-powder, salt and spice products, savory products, mustard products, vinegar products, sauces (condiments), tobacco products, cigars, cigarettes, processed foods, cooked fruits and vegetable products, meat and meat products, jellies, jams, fruit sauces, egg products, milk and dairy products, yoghurts, cheese products, butter and butter substitute products, milk substitute products, soy products, edible oils and fat products, medicaments, beverages, carbonated beverages, alcoholic drinks, beers, soft drinks, mineral and aerated waters and other non-alcoholic drinks, fruit drinks, fruit juices, coffee, artificial coffee, tea, cocoa, including forms requiring reconstitution, food extracts, plant extracts, meat extracts, condiments, sweeteners, nutraceuticals, gelatins, pharmaceutical and non-pharmaceutical gums, tablets, lozenges, drops, emulsions, elixirs, syrups and other preparations for making beverages, and combinations thereof.

Consumables may contain acids to provide a low pH. For example, many beverages have a low pH, for example, from pH 2.6 to 3. The sweetness enhancers herein-described also work under low pH conditions and show an enhancement effect.

How to sweeten consumables using sweeteners herein-described in a sufficient amount is well-known in the art. Depending on the consumable, the amount of sweetener can be reduced by addition of the sweetness enhancers herein-described. For example, for sucrose as sweetener, a reduction of about 1 to 4° Brix or more can be achieved.

Consumables may contain any amount of a sweetener as described herein. A useful range is, for example, at least 2%, for example about 2% to 15%, or about 5% to 12% of one or more selected from sucrose, fructose, glucose, high fructose corn syrup, or erythritol.

A useful range for artificial sweeteners is in a concentration isosweet to about 2 to 15% sucrose.

Different sweeteners may be used in combination in a concentration equivalent to at least 2% isointensity to sucrose.

For example, carbonated beverages usually contain about 10% to 12% high fructose corn syrup and/or sucrose.

EXAMPLES

The sweetness intensities used in sensory evaluations are as follows:

Barely detectable sweet taste is the sweetness of 0.5% sucrose solution

Weak sweet taste is the sweetness of 1% sucrose solution

Mild sweet taste is the sweetness of 2% sucrose

Strong sweet taste is the sweetness of 7% sucrose.

In comparative evaluations, the following descriptors are used in ascending order:

"barely perceivable late onsetting sweetness", "barely perceivable sweetness", "very weak sweetness", "weakly sweeter than sucrose control", "notably sweeter than sucrose control", "much sweeter than sucrose control", "substantially sweeter than sucrose control".

In all examples, the following extracts/compounds were used in the indicated concentration and quantity, unless otherwise stated. All concentrations in % are % (wt/wt), unless otherwise indicated.

*Rubus suavissimus* extract, also called rubus extract or rubusoside extract, contained 70% rubusoside by weight and is commercially available from Corona Science and Technology Corporation, Fu Zhou province, China. 60 ppm 70% rubusoside equals 42 ppm rubusoside.

Swingle extract, also known as Lou Han Gou extract, contained 80%, by weight, mogrosides comprising the naturally occurring terpene glycosides mogroside IV, mogroside V and 11-oxo-mogroside V and also the terpene glycoside siamenoside I in the final spray dried extract to equal 32.6% by weight. The concentration of mogroside V, which is the main mogroside active in the extract, is 20.8%. 11-oxo-mogroside V, mogroside IV and siamenoside I have been roughly quantified and together make not more than 12%, or lower.

Accordingly, a 60 ppm (0.0060% wt/wt) solution of swingle extract contains 12.48 ppm (0.001248% wt/wt) mogroside V, 45 ppm swingle contains 9.36 ppm mogroside V and 20 ppm contains 4.16 ppm mogroside V. The swingle extract is commercially available from Corona Science and Technology Corporation, Fu Zhou province, China.

With regard to the purity of the compounds employed, naringin dihydrochalcone had a concentration of >99%, neohesperidin dihydrochalcone had a concentration of >98%, rebaudioside A had a concentration of >99%, and stevioside had a concentration of >95%.

In the following, an overview over examples is given.
Examples 1-4 describe the methods in general.
Examples 5A-5C relate to NarDHC (Naringin Dihydrochalcone).
Examples 6A-6E relate to rubus extract.
Examples 7A-7F relate to swingle extract.
Examples 8A-8E relate to rebaudioside A.
Examples 9A-9D relate to stevioside.
Examples 10A-C and 11 A-H relate to mixtures of sweetness enhancers.
Examples 10A-C relate to mixtures of two sweetness enhancers.
Examples 11A-H relate to mixtures of two sweetness enhancers plus NDHC.
Examples 12A-12I relate to control examples of all sweetness enhancers Example 1

Comparative Sensory Evaluation of Sweetness Enhancers in 2 or 7% Sucrose

The test samples contained the potential sweetness enhancers in 0% sucrose (water), 2% sucrose, or 7% sucrose, and control samples of 0%, 2% and 7% sucrose without any additive. The sensory evaluations were conducted as follows. All samples were presented at ambient temperature in 15 ml aliquots to panels consisting of 5-9 sweet sensitive subjects of varying sweet sensitivity. After tasting each sample, the mouth was rinsed thoroughly with water at ambient temperature prior to tasting the next sample. The sucrose positive control (2% or 7%) was presented first and served as the sweetness reference to which all sweetness enhancer/sucrose combinations were directly compared.

One tasting sequence included tasting the sucrose control first, rinsing with water, tasting the sweetness enhancer/sucrose sample, rinsing with water followed by tasting the sucrose control again. Once the sequence was completed, each panelist chose the sample which was sweeter and evaluated the sweetness of each sample relative to one another.

In a second tasting sequence, this same procedure was followed for the water negative control versus the sweetness enhancer/water samples to determine the sweet taste due to the sweetness enhancer itself at each tested concentration. Panelists evaluated the sweetness of the sweetness enhancer in water for each concentration. For their evaluation, panelists were allowed to compare any perceived sweetness of the sweetness enhancer to the 2% or 7% sucrose control to determine the relative intensity of sweetness. Mild sweet taste corresponds to the taste of 2% sucrose, strong sweet taste corresponds to the taste of 7% sucrose.

Further descriptors below or above the degree of sweetness of the sucrose controls that were used were, in ascending order, "barely perceivable late onsetting sweetness", "barely perceivable sweetness", "very weak sweetness" (for the samples below 2% sucrose), and "weakly sweeter than sucrose control", "notably sweeter than sucrose control", "much sweeter than sucrose control", "substantially sweeter than sucrose control" (for the samples above the sucrose control).

Alternatively to sucrose, the evaluation may be performed with another sweetener, for example, high fructose (55%) corn syrup (HFCS, containing 55% fructose and 45% glucose), erythritol, sucralose, aspartame, or acesulfame potassium (AceK).

Example 2

A Forced Choice Test of Sweetness Enhancers in Water, 2% Sucrose and 7% Sucrose

All sweetness enhancer samples were evaluated at the same concentration, which was selected close to the threshold of each sweetness enhancer, in 0% sucrose (water), 2% sucrose, and 7% sucrose.

The test samples were evaluated by a sensory panel of 10 sweet sensitive panelists. Samples were presented in 3 replicates to each panelist to give n=30 evaluations for each panel. The sensory evaluation was conducted using a forced choice method. Samples were presented blind, unidentifiable by panelists. Three runs at different sucrose concentrations were performed (0% sucrose (water/negative control), 2% sucrose, 7% sucrose). In each run, the sweetness enhancer sample was compared by panelists to a corresponding sample without sweetness enhancer at the same sucrose concentration. Panelists were instructed that they had to choose one of the samples as sweeter. The data was analysed using beta-binomial analysis. Further, panelists were asked to rate each presented sample for sweetness using the generalized labeled magnitude scale (0=no sweetness; 10=strongest imaginable sensation of any kind). The rating data was compared using the paired t-test.

Alternatively, 0% (water), 0.5% and/or 1% and/or 1.5% sucrose were used for samples/corresponding controls and evaluated accordingly.

As a further control, the sweetness enhancer in water was compared to 0.5% and/or 1% and/or 1.5% sucrose. The result determined the sweetness intensity of the sweetness enhancer compound as such, without the sweetness due to the enhancement of sucrose.

Example 3

Ranking Tests to Determine the Sweetness Isointensity of Sweetness Enhancers to Sucrose Solutions For comparative ranking, samples of 0.5%, 1%, 1.5%, 7%, 8%, 9%, 10% and 11% sucrose solutions were prepared.

3a) Sweetness Isointensity of Sweetness Enhancer in Sucrose Solutions

The sensory evaluation was conducted using a ranking method. Samples at ambient temperature were randomly presented in 15 ml blind aliquots (unidentifiable by panelists). Panels consisted of 10 sweet sensitive subjects and samples were presented in 4 replications over 2 sessions. After tasting each sample, the mouth was rinsed thoroughly with water at ambient temperature prior to tasting the next sample. Panelists were presented with 7%, 8%, 9%, 10%, 11% sucrose samples and a sixth sample of 7% sucrose with a sweetness enhancer in a concentration near its sweetness detection threshold. They were asked to rank the samples from low to high with respect to perceived sweet taste. R-indices were calculated for 7% sucrose with the sweetness enhancer versus 7%, 8%, 9%, 10% or 11% sucrose.

3b) Near Threshold Sweetness Isointensity of Sweetness Enhancer in Water

The sensory evaluation was conducted using a ranking method. Samples at ambient temperature were randomly presented in 15 ml blind aliquots (unidentifiable by panelists). Panels consisted of 10 sweet sensitive subjects and samples were presented in 4 replications over 2 sessions. After tasting each sample, the mouth was rinsed thoroughly with water at ambient temperature prior to tasting the next sample. Panelists were presented with either 0.5% and 1% sucrose or 1% and 1.5% sucrose and a third sample of water with a sweetness enhancer in a concentration near its sweetness detection threshold. They were asked to rank the samples from low to high with respect to perceived sweet taste. R-indices were calculated for the sweetness enhancer in water versus either 0.5% and 1% sucrose or 1% and 1.5% sucrose.

An R-index greater than the higher critical value means that the sweetness enhancer sample was significantly sweeter than the sucrose sample. An R-index from 50% to the critical value means the sweetness enhancer sample had an equivalent sweetness to the compared sucrose sample. An R-index below the lower critical value indicates that the sucrose sample was sweeter than the sweetness enhancer sample.

Example 4

Paired Comparisons of Sweetness Enhancers and Mixtures Thereof in Water and 7% Sucrose Samples of sweetness enhancers were prepared in water or 7% sucrose. One, two or three sweetness enhancers were used in a sample. All samples were presented to panelists at ambient temperature. The sensory evaluation was conducted using a paired comparison method. Samples in water were only compared to other samples in water, the same applies to samples in 7% sucrose. Samples were paired randomly and presented in unidentifiable pairs of two (left and right) to the panelists in random order. The sample on the left was tasted first, followed by rinsing the mouth with water, then tasting the sample on the right. Once completing the sequence, each panelist ranked the pair of samples for sweetness then evaluated samples with respect to one another with the following descriptors (in ascending order):

"significantly less sweet", "less sweet", "notably less sweet", "isosweet", "weakly sweeter", "notably sweeter", "sweeter".

Examples 5A-5C

Naringin Dihydrochalcone (NarDHC)

Example 5A

Comparative Sensory Evaluation of NarDHC in 2% Sucrose

NarDHC (20, 60 and 100 ppm) was evaluated as a sweetness enhancer in 2% sucrose as described in example 1. The results are indicated in the table below.

| NarDHC [ppm] | Sensory evaluation of sweetness intensity |
|---|---|
| 0 in water (negative control) | no sweetness |
| 0 in 2% sucrose (positive control) | mild sweet taste |
| 20 in 2% sucrose | notably sweeter than sucrose control |
| 60 in 2% sucrose | much sweeter than sucrose control |
| 100 in 2% sucrose | substantially sweeter than 2% sucrose control |
| 20 in water | barely perceived delayed sweetness vs. 2% sucrose control |
| 60 in water | very weak delayed sweetness far below 2% sucrose control |
| 100 in water | mild sweetness slightly below 2% sucrose control |

The 100 ppm NarDHC in 2% sucrose was perceived as substantially sweeter than the sucrose control by panelists. For 100 ppm NarDHC in water, a mild sweetness slightly below 2% sucrose control was perceived.

The 60 ppm NarDHC in 2% sucrose was perceived as much sweeter than the sucrose control by panelists. The 60 ppm NarDHC in water had a very weak delayed sweetness far below 2% sucrose in water alone.

The 20 ppm NarDHC in 2% sucrose was perceived as notably sweeter than the sucrose control. The 20 ppm NarDHC in water was barely perceived as sweet with a delayed onset only perceived after holding in the mouth for several seconds.

The results above demonstrate the enhancement in the sweetness intensity of 2% sucrose by NarDHC when used in concentrations at or below sweetness detection level (20 ppm, and 60 ppm). The NarDHC in water samples that were tested in the same concentration in comparison demonstrate that the detected enhancement effect was not due to the sweetness of the NarDHC as such in these concentrations.

For NarDHC at 100 ppm, while 2% sucrose was perceived as substantially sweeter than the sucrose control, NarDHC in water already tasted mildly sweet. Even though this was below the sucrose control in the degree of perceived sweetness, a more than additive effect was not seen at the concentration of 100 ppm in this test.

Example 5B

Ranking Test of 45 ppm NarDHC in 7% Sucrose, Determining its Sucrose Isointensity A 45 ppm NarDHC in 7% sucrose sample was evaluated for its isointensity to sucrose solutions in a concentration of 7-11% using the ranking method described in example 3. The results are indicated in the table below.

| sucrose solution [% wt/wt] | NarDHC sample sweetness | R-index [%] | Critical value [%] | p-value |
|---|---|---|---|---|
| 7% | sweeter | 89% | 64.61 | P < 0.05 |
| 8% | isosweet | 53% | 64.61 | P < 0.05 |
| 9% | less sweet | 12% | 35.39 | P < 0.05 |
| 10% | less sweet | 4% | 35.39 | P < 0.05 |
| 11% | less sweet | 0.6% | 35.39 | P < 0.05 |

An R-index of 89%, which is greater than the critical value (64.61%), means that the NarDHC sample was significantly sweeter than the sucrose sample at 7%. An R-index of 53% (i.e. below the critical value) is equivalent to chance meaning the NarDHC sample was isosweet to 8% sucrose. The R-index between 0.6%-12%, which was below the critical value (35.39%), means the NarDHC sample was less sweet than either 9%, 10% and 11% sucrose.

Accordingly, 45 ppm NarDHC in 7% sucrose adds 1° Brix of sucrose sweetness intensity to enhance the sweetness to the equivalent of an 8% sucrose solution.

Based on the sweetness of NarDHC determined in control example 12A as isosweet to 0.5% sucrose, 45 ppm NarDHC in 7% sucrose would be expected to taste equivalent to 7.5% sucrose if the effect were merely additive. However, as shown in the present example, the combination of 45 ppm NarDHC in 7% sucrose had a sweetness isointense to 8% sucrose which was greater than expected.

Example 5C

Ranking Test of 60 ppm NarDHC in 7% Sucrose, Determining its Sucrose Isointensity A 60 ppm NarDHC in 7% sucrose sample was evaluated for isointensity to sucrose solutions in a concentration of 7-11% using the ranking method described in example 3. The results are indicated in the table below.

| sucrose solution [% wt/wt] | NarDHC sample sweetness | R-index [%] | Critical value [%] | p-value |
|---|---|---|---|---|
| 7% | Sweeter | 97% | 64.61 | P < 0.05 |
| 8% | Sweeter | 78% | 64.61 | P < 0.05 |
| 9% | Isosweet | 36% | 35.39 | P < 0.05 |
| 10% | less sweet | 8% | 35.39 | P < 0.05 |
| 11% | less sweet | 1% | 35.39 | P < 0.05 |

An R-index 78%-89%, which is greater than the critical value (64.61%), means that the NarDHC sample was significantly sweeter than the sucrose sample at 7% or 8%. An R-index of 36%, which is equal to the critical value (35.39%) means the NarDHC sample was isosweet to 9% sucrose. The R-index 1%-8%, which is below the critical value (35.39%), means the NarDHC sample was less sweet than either 10% or 11% sucrose.

Accordingly, 60 ppm NarDHC in 7% sucrose adds 2° Brix sucrose sweetness intensity to enhance the sweetness to the equivalent of a 9% sucrose solution.

Based on this result, the 7% sucrose+60 ppm NarDHC would be expected to be equivalent in sweetness to sucrose of from above 8% to below 8.5%, interpolated to 8.25% sucrose, if the effect were merely additive according to example 12A. However, as shown above, the combination of 60 ppm NarDHC with 7% sucrose had a sweetness isointensity to 9% sucrose, clearly greater than the expected effect.

Examples 6A-6E

Rubus Extract

Example 6A

Comparative Sensory Evaluation of Rubus Extract in 2% Sucrose

Rubus extract (20 ppm and 60 ppm), comprising 70% rubusoside by weight, was evaluated as a sweetness enhancer in 2% sucrose as described in example 1. The results are indicated in the table below.

| *Rubus* extract [ppm] | Sensory evaluation of sweetness intensity |
|---|---|
| 0 in water (negative control) | no sweetness |
| 0 in 2% sucrose (positive control) | mild sweet taste |
| 20 in 2% sucrose | notably sweeter than sucrose control |
| 60 in 2% sucrose | much sweeter than sucrose control |
| 20 in water | no sweetness |
| 60 in water | barely perceivable sweetness |

The 60 ppm rubus extract in 2% sucrose was perceived as much sweeter than the sucrose control by panelists. The 60 ppm rubus extract in water was barely perceived as sweet.

The 20 ppm rubus extract in 2% sucrose was perceived as notably sweeter than the sucrose control. The 20 ppm rubus extract in water was not perceived as sweet.

The results above demonstrate the enhancement in the sweetness intensity of 2% sucrose by rubus extract when used in concentrations at or below sweetness detection level (60 ppm and 20 ppm). The rubus extract in water samples that were tested in the same concentration in comparison demonstrate that the detected enhancement effect was not due to the sweetness of the rubus extract as such. Further, the results in control example 12B show that the sweetness of 60 ppm rubus extract was significantly below that of 1% sucrose.

Example 6B

Comparative Sensory Evaluation of Rubus Extract in 7% Sucrose

Rubus extract (20 ppm and 60 ppm), comprising 70% rubusoside by weight, was evaluated as a sweetness enhancer in 7% sucrose as described in example 1. The results are indicated in the table below.

| *Rubus* extract [ppm] | Sensory evaluation of sweetness intensity |
|---|---|
| 0 in water (negative control) | no sweetness |
| 0 in 7% sucrose (positive control) | strong sweet taste |
| 20 in 7% sucrose | notably sweeter than sucrose control |
| 60 in 7% sucrose | much sweeter than sucrose control |
| 20 in water | no sweetness |
| 60 in water | barely perceivable sweetness |

For all concentrations of rubus extract (20 ppm, 60 ppm) in 7% sucrose, a significant increase in sweetness intensity was determined by panelists that was significantly above the sweetness intensity determined in the sucrose control.

The results above demonstrate the enhancement in the sweetness intensity of 7% sucrose by rubus extract when used in concentrations at or below sweetness detection level (60 ppm, 20 ppm). The rubus extract in water samples that were tested in the same concentration in comparison demonstrate that the detected enhancement effect was not due to the sweetness of the rubus extract as such. Further, the results in control example 12B show that the sweetness of 60 ppm rubus extract was significantly below that of 1% sucrose.

Example 6C

Ranking Test of 60 ppm Rubus Extract in 7% Sucrose, Determining its Sucrose Isointensity A 60 ppm rubus extract, comprising 70% rubusoside by weight, in 7% sucrose sample was evaluated for isointensity to sucrose solutions in a concentration of 7-11% using the ranking method described in example 3. The results are indicated in the table below.

| Sucrose solution [% wt/wt] | Rubus sample sweetness | R-index [%] | Critical value [%] | p-value |
|---|---|---|---|---|
| 7% | sweeter | 92% | 67.45% | P < 0.01 |
| 8% | sweeter | 71% | 67.45% | P < 0.01 |
| 9% | less sweet | 28% | 32.55% | P < 0.01 |
| 10% | less sweet | 9% | 32.55% | P < 0.01 |
| 11% | less sweet | 5% | 32.55% | P < 0.01 |

An R-index of 92% and 71%, which is greater than the higher critical value (67.45%), means that the 70% rubus extract sample was significantly sweeter than the sucrose sample at 7% and at 8% sucrose. An R-index from 50% to the critical value (67.45%) would mean that the 70% rubus extract sample had an equivalent sweetness to the compared sucrose sample. An R-index of 28% which is below the lower critical value (32.55%) indicates that the sucrose sample was sweeter than the 70% rubus extract sample.

The data shows that the perceived sweetness of 7% sucrose with 60 ppm rubus extract was significantly higher than the sweetness of 8% sucrose but below the sweetness of 9% sucrose.

The results in control example 12B show that the sweetness of 60 ppm rubus extract was significantly below that of 1% sucrose. Accordingly, the effect shown wherein the sweetness is enhanced by an equivalent of more than 1° Brix sucrose sweetness intensity (7% sucrose with rubus extract tastes sweeter than 8% sucrose) clearly shows a more than additive effect.

Example 6D

Comparative Sensory Evaluation of Rubus Extract in HFCS

Rubus extract (20 ppm and 60 ppm), comprising 70% rubusoside by weight, was evaluated as a sweetness enhancer in 7% high fructose (55%) corn syrup (HFCS) as described in example 1. HFCS has a slightly higher sweetness than sucrose. The results are indicated in the table below.

| Rubus extract [ppm] | Sensory evaluation of sweetness intensity |
|---|---|
| 0 in water—negative control | no sweetness |
| 0 in 7% HFCS—(positive control) | strong sweet taste |
| 20 in 7% HFCS | notably sweeter than HFCS control |
| 60 in 7% HFCS | much sweeter than HFCS control, bitter |
| 20 in water | no sweetness |
| 60 in water | barely perceivable sweet |

The 60 ppm rubus extract in 7% HFCS was perceived as much sweeter than the HFCS control by panelists. The 60 ppm rubus extract in water was barely perceived as sweet.

The 20 ppm rubus extract in 7% HFCS was perceived as notably sweeter than the HFCS control by panelists. The 20 ppm rubus extract in water was not perceived as sweet.

The results above demonstrate the enhancement in the sweetness intensity of 7% HFCS (55%) by rubus extract when used in concentrations at or below sweetness detection level (60 ppm and 20 ppm). The rubus extract in water samples that were tested in the same concentration in comparison demonstrate that the detected enhancement effect was not due to the sweetness of the rubus extract as such. Further, it was shown that the sweetness of 60 ppm rubus extract was less than that of 1% sucrose (control example 12B).

Example 6E

Comparative Sensory Evaluation of 70% Rubus Extract in Erythritol

Rubus extract (20 ppm and 60 ppm), comprising 70% rubusoside by weight, was evaluated as sweetness enhancer in 7% erythritol as described in example 1. Erythritol is about 70% of the sweetness of sucrose (therefore less sweet). The results are indicated in the table below.

| Rubus extract [ppm] | Sensory evaluation of sweetness intensity |
|---|---|
| 0 in water (negative control) | no sweetness |
| 0 in 7% erythritol (positive control) | strong sweet taste |
| 20 in 7% erythritol | notably sweeter than erythritol control |
| 60 in 7% erythritol | much sweeter than erythritol control, no bitter |
| 60 in water | barely perceivable sweetness |
| 20 in water | no sweetness |

The 60 ppm rubus extract in 7% erythritol was perceived as much sweeter than the erythritol control by panelists. The 60 ppm rubus extract in water was barely perceived as sweet.

The 20 ppm rubus extract in 7% erythritol was perceived as notably sweeter than the erythritol control by panelists. The 20 ppm rubus extract in water was not perceived as sweet.

The results above demonstrate the enhancement in the sweetness intensity of 7% erythritol by rubus extract when used in concentrations at or below sweetness detection level (60 ppm and 20 ppm). The rubus extract in water samples that were tested in the same concentration in comparison demonstrate that the detected enhancement effect was not due to the sweetness of the rubus extract as such. Further, it was shown that the sweetness of 60 ppm rubus extract was less than that of 1% sucrose (control example 12B).

Examples 7A-7F

Swingle Extract

Example 7A

Comparative Sensory Evaluation of Swingle Extract (20, 60 and 100 ppm) in 2% Sucrose Swingle extract (20 ppm, 60 ppm, 100 ppm) was evaluated as sweetness enhancer in 2% sucrose as described in example 1. The results are indicated in the table below.

| Swingle extract [ppm] | Sensory evaluation of sweetness intensity |
|---|---|
| 0 in water (negative control) | no sweetness |
| 0 in 2% sucrose (positive control) | mild sweet taste |
| 20 in 2% sucrose | notably sweeter than sucrose control |
| 60 in 2% sucrose | much sweeter than sucrose control |
| 100 in 2% sucrose | substantially sweeter than sucrose control |
| 20 in water | no sweetness |
| 60 in water | barely perceivable sweetness vs. 2% sucrose control |
| 100 in water | very weak sweet far below the 2% sucrose control |

The 100 ppm swingle extract in 2% sucrose was perceived as substantially sweeter than the sucrose control by panelists. The 100 ppm swingle extract in water was perceived as very weakly sweet and far below the sweetness of 2% sucrose.

The 60 ppm swingle extract in 2% sucrose was perceived as substantially sweeter than the sucrose control by panelists. The 60 ppm swingle extract in water was barely perceived as sweet.

The 20 ppm swingle extract in 2% sucrose was perceived as notably sweeter than the sucrose control by panelists. The 20 ppm swingle extract in water was not perceived as sweet.

The results above demonstrate the enhancement in the sweetness intensity of 2% sucrose by swingle extract when used in concentrations at, below, or slightly above sweetness detection level (60 ppm, 20 ppm, and 100 ppm). The swingle extract in water samples that were tested in the same concentration in comparison demonstrate that the detected enhancement effect was not due to the sweetness of swingle extract as such.

Example 7B

Comparative Sensory Evaluation of Swingle Extract (20, 60 and 100 ppm) in 7% Sucrose Swingle extract (20 ppm, 60 ppm, 100 ppm) was evaluated as sweetness enhancer in 7% sucrose as described in example 1. The results are indicated in the table below.

| Swingle extract [ppm] | Sensory evaluation of sweetness intensity |
|---|---|
| 0 in water (negative control) | no sweetness |
| 0 in 7% sucrose (positive control) | strong sweet taste |
| 20 in 7% sucrose | sweeter than sucrose control |
| 60 in 7% sucrose | much sweeter than sucrose control |
| 100 in 7% sucrose | substantially sweeter than sucrose control |
| 20 in water | no sweetness |
| 60 in water | barely perceivable sweetness |
| 100 in water | very weak sweetness far below the 2% sucrose control |

For all concentrations of swingle extract in 7% sucrose (20, 60, 100 ppm), an increase in sweetness intensity was determined by panelists that was above the sweetness intensity determined in the 7% sucrose control.

The results above demonstrate the enhancement in the sweetness intensity of 7% sucrose by swingle extract when used in concentrations at, below, or slightly above the sweetness detection level (60 ppm, 20 ppm, 100 ppm). As the swingle extract in water samples that were tested in the same concentration in comparison demonstrate, the detected enhancement effect was not due to the sweetness of the 70% swingle extract as such.

The strength of the enhancement effect of swingle extract on sucrose depends on the sucrose concentration, and tends to be stronger with increasing sucrose concentration. If the difference of samples with and without sweetness enhancer in 7% sucrose is directly compared to the difference between samples with and without sweetness enhancer in 2% sucrose (see example 7A), the enhancing effect appears to be stronger with the higher sucrose concentration.

Example 7C

Ranking Test of 60 ppm Swingle Extract in 7% Sucrose, Determining the Sucrose Isointensity A 60 ppm swingle extract in 7% sucrose sample was evaluated for its isointensity to sucrose solutions in a concentration of 7-11% using the ranking method described in example 3. The results are indicated in the table below.

| sucrose solution [% wt/wt] | Swingle sample sweetness | R-index [%] | Critical value [%] | p-value |
|---|---|---|---|---|
| 7% | Sweeter | 92% | 72.18 | P < 0.001 |
| 8% | Sweeter | 68% | 67.45 | P < 0.01 |
| 9% | less sweet | 25% | 27.82 | P < 0.001 |
| 10% | less sweet | 7% | 27.82 | P < 0.001 |
| 11% | less sweet | 5% | 27.82 | P < 0.001 |

An R-index of 92%, which is greater than the higher critical value (72.18%), means that the swingle sample was significantly sweeter than the sucrose sample at 7%. An R-index from 50% to the critical value (67.45%) would mean that the swingle sample had an equivalent sweetness to the compared sucrose sample. At 68% it was slightly higher than a concentration of 8% sucrose.

An R-index of 25% below the lower critical value (27.82%) indicates that the sucrose sample was sweeter than the swingle sample.

The data shows that the perceived sweetness of 7% sucrose with 60 ppm swingle was significantly higher than the sweetness of 8% sucrose but below the sweetness of 9% sucrose, 8.5% by interpolation.

As a control, 60 ppm swingle in water had an isointensity of above 0.5% but below 1% sucrose (0.75% by interpolation, compare example 12C). Accordingly, the 7% sucrose+60 ppm swingle extract (isosweet to below 1% sucrose and above 0.5% sucrose, interpolated to 0.75% sucrose), would be expected to be isosweet to below 8% sucrose, or below 7.75% sucrose by interpolation. However, the determined isointensity was above 8% sucrose, interpolated to 8.5% sucrose, clearly above the expected effect.

Example 7D

Comparative Sensory Evaluation of Swingle Extract in HFCS

Swingle extract (20 ppm and 60 ppm) was evaluated as a sweetness enhancer in 7% high fructose (55%) corn syrup (HFCS) as described in example 1. The results are indicated in the table below.

| Swingle extract [ppm] | Sensory evaluation of sweetness intensity |
| --- | --- |
| 0 in water (negative control) | no sweetness |
| 0 in 7% HFCS (positive control) | strong sweet taste |
| 20 in 7% HFCS | notably sweeter than HFCS control |
| 60 in 7% HFCS | much sweeter than HFCS control |
| 20 in water | no sweetness |
| 60 in water | barely perceivable sweetness |

The 60 ppm swingle extract in 7% HFCS (55%) was perceived as much sweeter than the HFCS control by panelists. The 60 ppm swingle extract in water was barely perceived as sweet.

The 20 ppm swingle extract in 7% HFCS (55%) was perceived as notably sweeter than the HFCS control. The 20 ppm swingle extract in water was not perceived as sweet.

The results above demonstrate the enhancement in the sweetness intensity of 7% HFCS (55%) by swingle extract when used in concentrations at or below sweetness detection level (60 ppm and 20 ppm). The swingle extract in water samples that were tested in the same concentration in comparison demonstrate that the detected enhancement effect was not due to the sweetness of the swingle extract as such.

Example 7E

Comparative Sensory Evaluation of Swingle Extract in Erythritol

Swingle extract (20 ppm and 60 ppm) was evaluated as a sweetness enhancer in 7% erythritol as described in example 1. The results are indicated in the table below.

| Swingle extract [ppm] | Sensory evaluation of sweetness intensity |
| --- | --- |
| 0 in water (negative control) | no sweetness |
| 0 in 7% erythritol (positive control) | strong sweet taste |
| 20 in 7% erythritol | notably sweeter than erythritol control |
| 60 in 7% erythritol | much sweeter than erythritol control |
| 20 in water | no sweetness |
| 60 in water | barely perceivable sweetness |

The 60 ppm swingle extract in 7% erythritol was perceived as much sweeter than the erythritol control by panelists. The 60 ppm swingle extract in water was barely perceived as sweet.

The 20 ppm swingle extract in 7% erythritol was perceived as notably sweeter than the erythritol control by panelists. The 20 ppm swingle extract in water was not perceived as sweet.

The results above demonstrate the enhancement in the sweetness intensity of 7% erythritol by swingle extract when used in concentrations at or below sweetness detection level of swingle (60 ppm and 20 ppm). The swingle extract in water samples that were tested in the same concentration in comparison demonstrate that the detected enhancement effect was not due to the sweetness of the swingle extract as such.

Example 7F

Fractionated Swingle Extract

Comparative Sensory Evaluation of in 0% and 2% Sucrose

Swingle extract, comprising 80% total mogroside content by weight, was fractionated by reversed phase (C-18) flash chromatography. Compounds were eluted using a mixture of methanol (MeOH) in water starting at 30% MeOH (264 ml) followed by a linear gradient of 30-80% MeOH (1320 ml) then finally the column was flushed with 80% MeOH (264 ml). The solvents were introduced at a flow rate of 30 ml/min throughout the separation procedure. Eluted compounds were visualized with a UV detector set at 210 nm and a Corona light scattering detector. Collected fractions were pooled according to the table below then freeze dried to powders.

The powders corresponding to various pooled fractions as given in the table below were dissolved in a concentration of 60 ppm in either 0% or 2% sucrose. The taste of these samples was compared by panelists to controls of 0% and 2% sucrose accordingly as indicated in the table below. The sample in 0% sucrose when determined to be sweet was in addition to the 0% sucrose control also compared to a 2% sucrose control and to the other fractions to estimate the degree of sweetness. The comparative degree of sweetness is indicated (in ascending order: barely detectably sweet—very much below 2% sucrose—much below 2% sucrose—below 2% sucrose— close to 2% sucrose).

Thus the sweetness enhancement effect each fraction or pool of fractions exhibited in 2% sucrose was determined.

The results are indicated in the table below.

| Fraction # (combined) | Mogroside V content (%) | Sweetness of fraction in 2% sucrose vs. 2% sucrose control | Sweetness of fraction in 0% sucrose vs. 0% sucrose control |
| --- | --- | --- | --- |
| 3-7 | 0 | same | same |
| 8-12 | 0 | same | same |
| 13-15 | 0 | same | same |
| 16-20 | 0 | slightly sweeter | same |
| 21-25 | 0 | slightly sweeter | same |
| 26-30 | 0 | slightly sweeter | same |
| 31-33 | 0 | slightly sweeter | same |
| 34 | 2.8 | notably sweeter | very weakly sweet (very much below 2% sucrose) |
| 35 | 42.1 | much sweeter | same |
| 36 | 88.5 | very much sweeter | sweet (much below 2% sucrose) |
| 37 | 73.4 | very much sweeter | sweet (below 2% sucrose) |
| 38 | 65.1 | very much sweeter | sweet (below 2% sucrose control) |
| 39 | 40.1 | much sweeter | slightly sweet |
| 40 | 11.3 | slightly sweeter | very weakly sweet (very much below 2% sucrose) |
| 41 | 2.6 | slightly sweeter | barely detectably sweet |
| 42-48 | 0.9 | sweeter | same |

The strongest enhancement effect was observed within fractions 35-39, which contained the main part of the mogroside V content.

Fractions 34 and 35 also had a weaker enhancement effect. An analysis by liquid chromatography and mass spectrometry of fractions 34 and 35 showed that they contained siamenoside I.

Pooled fractions 42-48 showed an even weaker enhancement effect. An analysis by liquid chromatography and mass spectrometry of pooled fractions 42-28 showed mogroside IV.

This indicates that the observed enhancement effect was mainly due to mogroside V, with siamenoside I and mogroside IV contributing marginally in comparison.

An advantage of the main mogroside V fractions (36-38), and also fraction 35 that contained siamenoside I, was the clean sweet taste with no or only very slight herbal note at the used low concentration (60 ppm).

Example 8A-8E

Rebaudioside A

Example 8A

Rebaudioside A

Comparative Sensory Evaluation of Rebaudioside A (1, 10, 20 and 30 ppm) in 2% Sucrose Rebaudioside A (99%+, purified from plant extract, Sweet Aloha Farms, LLC) (1 ppm, 10 ppm, 20 ppm, 30 ppm) was evaluated in 2% sucrose as described in example 1. The results are indicated in the table below.

| Rebaudioside A [ppm] | Sensory evaluation of sweetness intensity |
| --- | --- |
| 0 in water (negative control) | no sweetness |
| 0 in 2% sucrose (positive control) | mild sweet taste |
| 1 in 2% sucrose | barely perceived as sweeter than sucrose control |
| 10 in 2% sucrose | notably sweeter than sucrose control |
| 20 in 2% sucrose | much sweeter than sucrose control |
| 30 in 2% sucrose | substantially sweeter than sucrose control |
| 1 in water | no sweetness |
| 10 in water | barely perceivable, late onsetting sweet |
| 20 in water | barely perceivable sweetness |
| 30 in water | very weak sweetness far below the 2% sucrose control |

For all concentrations of rebaudioside A in 2% sucrose (1, 10, 20, 30 ppm), an increase in sweetness intensity was determined by panelists that was above the sweetness intensity determined in the 2% sucrose control.

The results above demonstrate the enhancement in the sweetness intensity of 2% sucrose by rebaudioside A when used in concentrations at, below, or slightly above the sweetness detection level (1 ppm, 10 ppm, 20 ppm and 30 ppm). As the rebaudioside A in water samples that were tested in the same concentration in comparison demonstrate, the detected enhancement effect was not due to the sweetness of rebaudioside A as such.

Example 8B

Rebaudioside A

Comparative Sensory Evaluation of Rebaudioside A (1, 10, 20 and 300 ppm) in 7% Sucrose Rebaudioside A (99%+, purified from plant extract, Sweet Aloha Farms, LLC) (1 ppm, 10 ppm, 20 ppm, 30 ppm) was evaluated in 7% sucrose as described in example 1. The results are indicated in the table below.

| Rebaudioside A [ppm] | Sensory evaluation of sweetness intensity |
| --- | --- |
| 0 in water (negative control) | no sweetness |
| 0 in 7% sucrose (positive control) | strong sweet taste |
| 1 in 7% sucrose | very weakly sweeter than sucrose control |
| 10 in 7% sucrose | notably sweeter than sucrose control |
| 20 in 7% sucrose | much sweeter than sucrose control |
| 30 in 7% sucrose | substantially sweeter than sucrose control |
| 1 in water | no sweetness |
| 10 in water | barely perceivable, late onsetting sweet |
| 20 in water | barely perceivable sweetness |
| 30 in water | very weak sweetness far below the 2% sucrose control |

For all concentrations of rebaudioside A in 7% sucrose (1, 10, 20, 30 ppm), an increase in sweetness intensity was determined by panelists that was above the sweetness intensity determined in the 7% sucrose control.

The results above demonstrate the enhancement in the sweetness intensity of 7% sucrose by rebaudioside A when used in concentrations at, below, or slightly above the sweetness detection level (1 ppm, 10 ppm, 20 ppm and 30 ppm). As the rebaudioside A in water samples that were tested in the same concentration in comparison demonstrate, the detected enhancement effect was not due to the sweetness of rebaudioside A as such.

If the difference of samples with and without sweetness enhancer in 7% sucrose is directly compared to the difference between samples with and without sweetness enhancer in 2% sucrose (see example 8A), the enhancing effect was stronger with the higher sucrose concentration. This shows that the strength of the enhancement effect of rebaudioside A on sucrose depends on the sucrose concentration, and is stronger with increasing sucrose concentration.

Example 8C

Rebaudioside A

Sweetness Quality Evaluation of Rebaudioside A (1, 10, 20 and 30 ppm) in 2% Sucrose Rebaudioside A (99%+, purified from plant extract, Sweet Aloha Farms, LLC) (1 ppm, 10 ppm, 20 ppm, 30 ppm) in 2% sucrose samples was evaluated for the qualities of the sweetness of the samples (time of onset, localization, duration). The sensory evaluations were conducted as follows. All samples were presented at ambient temperature in 15 ml aliquots and presented blindly to sweet sensitive subjects of varying sweet sensitivity. Subjects tasted the samples and were asked to evaluate the quality of sweetness. Sucrose solutions (2% and 7%) were presented as references.

| Rebaudioside A [ppm] | Sensory evaluation of sweetness intensity |
| --- | --- |
| 0 in 2% sucrose (reference) | immediate onset, full mouth sweet, non-lingering |
| 0 in 7% sucrose (reference) | immediate onset, full mouth sweet, non-lingering |
| 1 in 2% sucrose | immediate onset, full mouth sweet, non-lingering |
| 10 in 2% sucrose | immediate onset full mouth sweet, non-lingering |
| 20 in 2% sucrose | immediate onset, full mouth sweet, non-lingering |
| 30 in 2% sucrose | immediate onset, sweetness localized to the periphery of the tongue, not a "full mouth" sweet, slightly lingering |

All rebaudioside samples in 2% sucrose were evaluated to have a pleasantly sweet taste. In each case, the sweetness was perceived all over the oral cavity ("full mouth sweet") with an immediate onset.

The evaluation of the 30 ppm rebaudioside A sample showed a localization of the sweetness perception at the periphery of the tongue instead of the entire oral cavity as observed for the 1 ppm, 10 ppm and 20 ppm rebaudioside A samples, or for the sucrose references (2+7%). The 30 ppm rebaudioside A sample was described by panelists to have a lingering sweet aftertaste that was not perceived at 20 ppm rebaudioside A or below perceived mainly at the periphery of the tongue rather than in the whole oral cavity ("full mouth sweetness"). The lingering taste quality is often described as cloying and licorice like.

Example 8D

Rebaudioside A

Sweetness Quality Evaluation of Rebaudioside A (1, 10, 20 and 30 ppm) in 7% Sucrose Rebaudioside A (99%+, purified from plant extract, Sweet Aloha Farms, LLC) (1 ppm, 10 ppm, 20 ppm, 30 ppm) in 7% sucrose samples were evaluated for the qualities of the sweetness of the samples (time of onset, localization, duration). The sensory evaluations were conducted as follows. All samples were presented at ambient temperature in 15 ml aliquots and presented blindly to sweet sensitive subjects of varying sweet sensitivity. Subjects tasted the samples and were asked to evaluate the quality of the sweetness. Sucrose solutions (2% and 7%) were presented as references to evaluate the sweetness of the rebaudioside A samples.

| Rebaudioside A [ppm] | Sensory evaluation of sweetness intensity (strength, onset, localisation, duration) |
|---|---|
| 0 in 2% sucrose (reference) | immediate onset, full mouth sweet, non-lingering |
| 0 in 7% sucrose (reference) | immediate onset, full mouth sweet, non-lingering |
| 1 in 7% sucrose | immediate onset, full mouth sweet, non-lingering |
| 10 in 7% sucrose | immediate onset, full mouth sweet, non-lingering |
| 20 in 7% sucrose | immediate onset, full mouth sweet, non-lingering |
| 30 in 7% sucrose | immediate onset, sweetness localized to the periphery of the tongue, slightly lingering |

The 1 ppm, 10 ppm and 20 ppm rebaudioside A samples and the 7% sucrose reference had a pleasantly strong sweet taste. In each case, the sweetness was perceived all over the oral cavity with an immediate onset. The 30 ppm rebaudioside A sample showed a sweetness localized to the periphery of the tongue instead of the entire oral cavity as observed for the 7% sucrose reference and rebaudioside A samples containing 1 ppm, 10 ppm or 20 ppm rebaudioside A. The 30 ppm rebaudioside A sample was described by panelists to have a lingering sweet aftertaste (compare example 8C) that was not perceived at 20 ppm rebaudioside A or lower concentrations.

Example 8E

Ranking Test of 20 ppm Rebaudioside A in 7% Sucrose, Determining the Sucrose Isointensity A 20 ppm rebaudioside A (99%+, purified from plant extract, Sweet Aloha Farms, LLC) in 7% sucrose sample was evaluated for its isointensity to sucrose solutions in a concentration of 7-11% using the ranking method described in example 3. The results are indicated in the table below.

| sucrose solution [% wt/wt] | Rebaudioside A sample sweetness | R-index [%] | Critical value [%] | p-value |
|---|---|---|---|---|
| 7% | sweeter | 91% | 64.61 | $P < 0.05$ |
| 8% | sweeter | 72% | 64.61 | $P < 0.05$ |
| 9% | less sweet | 7% | 35.39 | $P < 0.05$ |
| 10% | less sweet | 0% | 35.39 | $P < 0.05$ |
| 11% | less sweet | 0% | 35.39 | $P < 0.05$ |

An R-index from 72% to 91%, which is greater than the higher critical value (64.61%), means that the rebaudioside A sample was significantly sweeter than the sucrose sample at 7% and 8%. An R-index from 0% to 7%, which is below the critical value (35.39%), means that the rebaudioside A sample was less sweet than 9%, 10% or 11% sucrose.

The data shows that the perceived sweetness of 7% sucrose with 20 ppm rebaudioside A was significantly higher than the sweetness of 8% sucrose but below the sweetness of 9% sucrose, 8.5% by interpolation.

As a control, 20 ppm rebaudioside A in water had an isointensity of above 0.5% but below 1% sucrose (0.75% by interpolation, compare example 12D). Accordingly, the 7% sucrose+20 ppm rebaudioside A (isosweet to below 1% sucrose and above 0.5% sucrose, interpolated to 0.75% sucrose), would be expected to be isosweet to below 8% sucrose, or 7.75% sucrose by interpolation. However, the determined isointensity was above 8% sucrose, interpolated to 8.5% sucrose, clearly above the expected effect.

Example 9A-9D

Stevioside

Example 9A

Stevioside

Comparative Sensory Evaluation of Stevioside (20-60 ppm) in 2% Sucrose

Stevioside extract (95%+, purified from plant extract, Apin Chemicals) (20 ppm, 30 ppm, 40 ppm, 50 ppm, 60 ppm) in 2% sucrose samples were evaluated as described in example 1. The results are indicated in the table below.

| Stevioside [ppm] | Sensory evaluation of sweetness intensity |
|---|---|
| 0 in water (negative control) | no sweetness |
| 0 in 2% sucrose (positive control) | mild sweet taste |
| 20 in 2% sucrose | notably sweeter than sucrose control |
| 30 in 2% sucrose | much sweeter than sucrose control |
| 40 in 2% sucrose | much sweeter than sucrose control |
| 50 in 2% sucrose | much sweeter than sucrose control |
| 60 in 2% sucrose | substantially sweeter than sucrose control |
| 20 in water | barely detectable sweetness |
| 30 in water | very weak, late onsetting sweetness |
| 40 in water | weak late onsetting sweetness |
| 50 in water | weak sweetness, faster onset than 40 ppm, lingering sweetness |
| 60 in water | weak sweetness, faster onset than 50 ppm, lingering sweetness |

The 20 ppm stevioside in 2% sucrose was perceived as notably sweeter than the sucrose control by panelists. The 20 ppm stevioside in water was barely detectable as sweet The 30 ppm stevioside in 2% sucrose was perceived as much sweeter than the 2% sucrose control by panelists. The 30 ppm stevioside in water was perceived as very weakly sweet with a late onset.

The 40 ppm stevioside in 2% sucrose was perceived as much sweeter than the sucrose control by panelists. The 40 ppm stevioside in water was perceived as weakly sweet with a late onset.

The 50 ppm stevioside in 2% sucrose was perceived as much sweeter than the sucrose control by panelists. The 50 ppm stevioside in water was perceived as weakly sweet with a faster onset and lingering sweet taste.

The 60 ppm stevioside in 2% sucrose was perceived as substantially sweeter than the sucrose control by panelists. The 60 ppm stevioside extract in water was perceived as weakly sweet with a faster onset and lingering sweet taste.

The results above demonstrate the enhancement in the sweetness intensity of 2% sucrose by stevioside when used in concentrations near the sweetness detection threshold level from 20 to 60 ppm. The stevioside extract in water samples that were tested in the same concentration in comparison demonstrate that the detected enhancement effect is not due to the sweetness of the stevioside extract as such.

Example 9B

Stevioside

Comparative Sensory Evaluation of Stevioside (20-60 ppm) in 7% Sucrose

Stevioside extract (95%+, purified from plant extract, Apin Chemicals) (20 ppm, 30 ppm, 40 ppm, 50 ppm, 60 ppm) was evaluated in 7% sucrose as described in example 1. The results are indicated in the table below.

| Stevioside [ppm] | Sensory evaluation of sweetness intensity |
| --- | --- |
| 0 in water (negative control) | no sweetness |
| 0 in 2% sucrose (positive control) | mild sweet taste |
| 0 in 7% sucrose (positive control) | strong sweet taste |
| 20 in 7% sucrose | notably sweeter than sucrose control |
| 30 in 7% sucrose | notably sweeter than sucrose control |
| 40 in 7% sucrose | much sweeter than sucrose control |
| 50 in 7% sucrose | much sweeter than sucrose control |
| 60 in 7% sucrose | substantially sweeter than sucrose control |
| 20 in water | barely detectable sweetness |
| 30 in water | very weak, late onsetting sweetness |
| 40 in water | weak sweetness, late onsetting sweetness |
| 50 in water | weak sweetness, faster onset than 40 ppm-, lingering sweet taste |
| 60 in water | weak sweetness, faster onset than 50 ppm, lingering sweet taste |

The 20 ppm stevioside in 7% sucrose was perceived as notably sweeter than the sucrose control by panelists. The 20 ppm stevioside in water was barely detectable as sweet.

The 30 ppm stevioside in 7% sucrose was perceived as notably sweeter than the sucrose control by panelists. The 30 ppm stevioside in water was perceived as very weakly sweet with a late onset.

The 40 ppm stevioside in 7% sucrose was perceived as much sweeter than the sucrose control by panelists. The 40 ppm stevioside in water was perceived as weakly sweet with a late onset.

The 50 ppm stevioside in 7% sucrose was perceived as much sweeter than the sucrose control by panelists. The 50 ppm stevioside in water was perceived as weakly sweet with a faster onset and lingering sweet taste.

The 60 ppm stevioside extract in 7% sucrose was perceived as substantially sweeter than the sucrose control by panelists. The 60 ppm stevioside extract in water was perceived as weakly sweet with a faster onset and lingering sweet taste.

The results above demonstrate the enhancement in the sweetness intensity of 7% sucrose by stevioside when used in concentrations near sweetness detection threshold (20 ppm, 30 ppm, 40 ppm, 50 ppm, 60 ppm). The stevioside extract in water samples that were tested in the same concentration in comparison demonstrate that the detected enhancement effect was not due to the sweetness of the stevioside extract as such.

Example 9C

Stevioside

Sweetness Quality Evaluation of Stevioside (20-50 ppm) in 2% Sucrose

Stevioside extract (95%+, purified from plant extract, Apin Chemicals) (20 ppm, 30 ppm, 40 ppm, 50 ppm) was evaluated in 2% sucrose for the qualities of the sweetness of the samples (time of onset, localisation, duration). The sensory evaluations were conducted as follows. All samples were presented at ambient temperature in 15 ml aliquots and presented blindly to sweet sensitive subjects of varying sweet sensitivity. Subjects tasted the samples and were asked to evaluate the sweetness qualities. Sucrose solutions (2% and 7%) were presented as references.

| Stevioside [ppm] | Sensory evaluation of sweetness intensity (onset, localisation, duration) |
| --- | --- |
| 0 in 2% sucrose (reference) | immediate onset, full mouth sweet, not lingering |
| 0 in 7% sucrose (reference) | immediate onset, full mouth sweet, not lingering |
| 20 in 2% sucrose | immediate onset, full mouth sweet, not lingering |
| 30 in 2% sucrose | immediate onset, full mouth sweet, not lingering |
| 40 in 2% sucrose | immediate onset, full mouth sweet, not lingering |
| 50 in 2% sucrose | immediate onset, sweetness localized to the periphery of the tongue, slightly lingering |

All stevioside samples had a pleasantly sweet taste. For each sample, the sweetness was perceived all over the oral cavity ("full mouth sweet") with an immediate onset.

The 50 ppm stevioside in 2% sucrose was found to have a sweetness localized to the periphery of the tongue instead of the entire oral cavity.

The 20 ppm, 30 ppm or 40 ppm stevioside in 2% sucrose samples and 2% and 7% sucrose were observed to have a full mouth sweetness perception that is spread over the whole of the oral cavity.

The 50 ppm stevioside in 2% sucrose sample was described to have a lingering sweet taste (compare example 8C for details on lingering taste) that was not perceived in the 40 ppm stevioside sample or the stevioside samples with an even lower stevioside concentration Example 9D Stevioside Sweetness Quality Evaluation of Stevioside (20-50 ppm) in 7% Sucrose Stevioside (20 ppm, 30 ppm, 40 ppm, 50 ppm) was evaluated in 7% sucrose for the qualities of the sweetness of the samples (time of onset, localisation, duration). The sensory evaluations were conducted as follows. All samples were presented at ambient temperature in 15 ml aliquots and presented blindly to sweet sensitive subjects of varying sweet sensitivity. Subjects tasted the samples and were asked to evaluate the sweetness qualities. Sucrose solutions (2% and 7%) were presented as references to evaluate the sweetness of the stevioside samples.

| Stevioside [ppm] | Sensory evaluation of sweetness intensity (onset, localisation, duration) |
|---|---|
| 0 in 2% sucrose (reference) | immediate onset, full mouth sweet, not lingering |
| 0 in 7% sucrose (reference) | immediate onset, full mouth sweet, not lingering |
| 20 in 7% sucrose | immediate onset, full mouth sweet, not lingering |
| 30 in 7% sucrose | immediate onset, full mouth sweet, not lingering |
| 40 in 7% sucrose | immediate onset, full mouth sweet, not lingering |
| 50 in 7% sucrose | immediate onset, sweetness localized to the periphery of the tongue, slightly lingering |

The 20 ppm, 30 ppm and 40 ppm stevioside in 7% sucrose samples all had a pleasantly strong sweet taste. In the 20-40 ppm stevioside in 7% sucrose samples, the sweetness was perceived all over the oral cavity with an immediate onset.

The 50 ppm stevioside in 7% sucrose sample had a sweetness localized to the periphery of the tongue instead of the entire oral cavity as observed for the sucrose references, and the 20 ppm, 30 ppm and 40 ppm stevioside samples. The 50 ppm stevioside in 7% sucrose sample was described to have a lingering sweet taste (compare example 8C for details on lingering taste) that was not perceived at 40 ppm stevioside or lower concentrations of stevioside.

Examples 10 and 11 Mixtures Sweetness Enhancers

Examples 10A-10C

Example 10A

Ranking Test of 45 ppm NarDHC+60 ppm Swingle Extract in 7% Sucrose, Determining its Sucrose Isointensity A 45 ppm NarDHC+60 ppm swingle extract in 7% sucrose sample was evaluated for isointensity to sucrose solutions in a concentration of 7-11% using the ranking method described in example 3. The results are indicated in the table below.

| sucrose solution [% wt/wt] | sample sweetness (NarDHC + swingle) | R-index [%] | Critical value [%] | p-value |
|---|---|---|---|---|
| 7% | sweeter | 100% | 64.61 | P < 0.05 |
| 8% | sweeter | 86% | 64.61 | P < 0.05 |
| 9% | sweeter | 67% | 64.61 | P < 0.05 |
| 10% | less sweet | 18% | 35.39 | P < 0.05 |
| 11% | less sweet | 7% | 35.39 | P < 0.05 |

An R-index from 67-100%, which was greater than the critical value (64.61%), means that the NarDHC+swingle sample is significantly sweeter than the sucrose sample at 7%, 8% or 9%. An R-index from 7-18%, which was below the critical value (35.39%), means that the NarDHC+swingle sample is less sweet than either 10% or 11% sucrose. The NarDHC+swingle sample in 7% sucrose was found to be sweeter than 9% and less sweet than 10%, and accordingly isosweet to 9.5% sucrose by interpolation.

As a control, the sweetness of 45 ppm NarDHC in water was isosweet to 0.5% sucrose (compare control example 12A).

The 60 ppm swingle in water had an isointensity of above 0.5% but below 1% sucrose (0.75% by interpolation according to example 12C).

Accordingly, the 7% sucrose+45 ppm NarDHC (isotense to 0.5% sucrose)+60 ppm swingle extract (isosweet to below 1% sucrose, interpolated to 0.75% sucrose), would be expected to be isosweet to below 8.5% sucrose, or below 8.25% sucrose by interpolation, assuming an additive effect.

However, the determined isointensity was above 9% sucrose, interpolated to 9.5% sucrose, clearly above a merely additive effect.

Example 10B

Ranking Test of 60 ppm NarDHC+60 ppm Swingle Extract in 7% Sucrose, Determining its Sucrose Isointensity A 60 ppm NarDHC+60 ppm swingle extract in 7% sucrose sample was evaluated for isointensity to sucrose solutions in a concentration of 7-11% using the ranking method described in example 3. The results are indicated in the table below.

| sucrose solution [% wt/wt] | sample sweetness (NarDHC + swingle) | R-index [%] | Critical value [%] | p-value |
|---|---|---|---|---|
| 7% | sweeter | 98% | 64.61 | P < 0.05 |
| 8% | sweeter | 92% | 64.61 | P < 0.05 |
| 9% | sweeter | 82% | 64.61 | P < 0.05 |
| 10% | isosweet | 61% | 64.61 | P < 0.05 |
| 11% | less sweet | 23% | 35.39 | P < 0.05 |

An R-index from 82-98%, which is greater than the critical value (64.61%), means that the NarDHC+swingle sample was significantly sweeter than the sucrose sample at 7%, 8% or 9%. An R-index from 61%, which is not significantly different from chance, means that the NarDHC+swingle sample was isosweet to 10% sucrose. An R-index of 23%, which is below the critical value (35.39%), means that the NarDHC+swingle sample was significantly less sweet than 11% sucrose.

As a control, 60 ppm NarDHC in water had a sweetness isointensity to sucrose of above 1% sucrose and below 1.5% sucrose (interpolated to 1.25% as shown in example 12A).

The 60 ppm swingle in water had a sweetness isointensity to sucrose of above 0.5% but below 1% sucrose (0.75% by interpolation as shown in the control according to example 12C).

Accordingly, the 7% sucrose+60 ppm NarDHC (isotense to below 1.5% sucrose, interpolated to 1.25% sucrose)+60 ppm swingle extract (isosweet to below 1% sucrose, interpolated to 0.75% sucrose), would be expected to be isosweet to below 9.5% sucrose, or below 9% sucrose by interpolation, assuming an additive effect.

However, the determined isointensity was 10% sucrose, clearly above a merely additive effect.

Example 10C

Ranking Test of 60 ppm Swingle Extract and 2 ppm NDHC+ in 7% Sucrose, Determining its Sucrose Isointensity A 60 ppm swingle extract+2 ppm NDHC in 7% sucrose sample was evaluated for isointensity to sucrose solutions in a concentration of 7-11% using the ranking method described in example 3. The results are indicated in the table below.

| Sucrose solutions [% wt/wt] | sample sweetness | R-index [%] | Critical value [%] | p-value |
|---|---|---|---|---|
| 7% | Sweeter | 98% | 72.18 | P < 0.001 |
| 8% | sweeter | 82% | 72.18 | P < 0.001 |
| 9% | isosweet | 43% | 37.26 | P < 0.05 |
| 10% | less sweet | 12% | 27.82 | P < 0.001 |
| 11% | less sweet | 4% | 27.82 | P < 0.001 |

An R-index from 82-98%, which is greater than the critical value (72.18%), means that the NDHC+swingle sample was significantly sweeter than the sucrose sample at 7% or 8%. An R-index 43%, which is not significantly different from chance, means that the NDHC+swingle sample was isosweet to 9% sucrose. An R-index of 4-12%, which is below the critical value (27.82%), means that the NDHC+swingle sample was significantly less sweet than 10% or 11% sucrose.

The 2 ppm NDHC in water has a sweetness isointensity to 0.5% sucrose (see example 12F).

The 60 ppm swingle in water has a sweetness isointensity of above 0.5% but below 1% sucrose (0.75% by interpolation as shown in example 12C).

Accordingly, the 7% sucrose+2 ppm NDHC (isotense to 0.5% sucrose)+60 ppm swingle extract (isosweet to below 1% sucrose, interpolated to 0.75% sucrose), would be expected to be isosweet to below 8.5% sucrose, or below 8.25% sucrose by interpolation.

However, the determined isointensity was 9% sucrose, clearly above a merely additive effect.

Examples 11A-H Sweetness Enhancer Mixtures and NDHC

Example 11A

Ranking Test of 60 ppm Swingle Extract+60 ppm NarDHC+2 ppm NDHC+ in 7% Sucrose, Determining its Sucrose Isointensity A sample of 60 ppm swingle extract+60 ppm NarDHC+2 ppm NDHC in 7% sucrose was evaluated for sweetness isointensity to sucrose solutions in a concentration of 7-11% using the ranking method described in example 3. The results are indicated in the table below.

| Sucrose solution [% wt/wt] | sample sweetness | R-index [%] | Critical value [%] | p-value |
|---|---|---|---|---|
| 7% | sweeter | 100% | 74.89 | P < 0.001 |
| 8% | sweeter | 100% | 74.89 | P < 0.001 |
| 9% | sweeter | 90% | 74.89 | P < 0.001 |
| 10% | sweeter | 79% | 74.89 | P < 0.001 |
| 11% | isosweet | 48% | 74.89 | P < 0.001 |

An R-index from 79-100%, which is greater than the critical value (74.89%), means that the NDHC+swingle+NarDHC sample was significantly sweeter than the sucrose sample at 7%, 8%, 9% and 10%. An R-index from 50% to the critical value (74.89%) would mean that the NDHC+swingle+NarDHC sample has an equivalent sweetness to the compared sucrose sample. At 48%, the NDHC+swingle+NarDHC sample was equivalent to 11% sucrose.

The 2 ppm NDHC in water had a sweetness isointensity to 0.5% sucrose (see example 12F).

The 60 ppm NarDHC in water had a sweetness isointensity to above 1% sucrose but below 1.5% sucrose (1.25% by interpolation as shown in example 12A).

The 60 ppm swingle in water had an isointensity of above 0.5% but below 1% sucrose (0.75% by interpolation as shown in example 12C).

Accordingly, the 7% sucrose+2 ppm NDHC (isosweet to 0.5% sucrose)+60 ppm NarDHC (isotense below 1.5% sucrose, interpolated to 1.25% sucrose)+60 ppm swingle extract (isosweet to below 1% sucrose, interpolated to 0.75% sucrose), would be expected to be isosweet to below 10% sucrose, or below 9.5% sucrose by interpolation, assuming an additive effect.

Furthermore, 2 ppm NDHC+60 ppm swingle extract+60 ppm NarDHC in water was determined to be less sweet than 2.25% sucrose thus the isointensity of the mixture in 7% sucrose would be expected to be less than 9.25% sucrose (see example 12G), assuming an additive effect.

However, the determined sweetness isointensity was an isointensity to 11% sucrose, which is clearly above a merely additive effect.

Example 11B

Ranking Test of 60 ppm Swingle Extract+60 ppm NarDHC+2 ppm NDHC in 6% Sucrose, Determining its Sucrose Isointensity A sample of 60 ppm swingle extract+60 ppm NarDHC+2 ppm NDHC in 6% sucrose sample was evaluated for isointensity to sucrose solutions in a concentration of 7-11% using the ranking method described in example 3. The results are indicated in the table below.

| Sucrose solutions [% wt/wt] | sample sweetness | R-index [%] | Critical value [%] | p-value |
|---|---|---|---|---|
| 7% | sweeter | 96% | 64.61 | P < 0.05 |
| 8% | sweeter | 91% | 64.61 | P < 0.05 |
| 9% | sweeter | 79% | 64.61 | P < 0.05 |
| 10% | isosweet | 53% | 64.61 | P < 0.05 |
| 11% | less sweet | 30% | 35.39 | P < 0.05 |

An R-index from 79-96%, which is greater than the higher critical value (64.61%), means that the enhancer mixture sample was significantly sweeter than the sucrose sample at 7%, 8% and 9%. An R-index of 53% is not significantly different from chance indicating the enhancer mixture sample had an equivalent sweetness to the 10% sucrose sample. An R-index of 30, which is less than the lower critical value (35.39%), means the enhancer mixture sample was significantly less sweet than 11% sucrose.

The 2 ppm NDHC in water had a sweetness isointensity to 0.5% sucrose (see example 12F).

The 60 ppm NarDHC in water had a sweetness isointensity to above 1% sucrose but below 1.5% sucrose (1.25% by interpolation, as shown in example 12A).

The 60 ppm swingle in water had an isointensity to above 0.5% but below 1% sucrose (0.75% by interpolation as shown in example 12C).

Accordingly, the 6% sucrose+2 ppm NDHC (isosweet to 0.5% sucrose)+60 ppm NarDHC (isotense below 1.5% sucrose, interpolated to 1.25% sucrose)+60 ppm swingle extract (isosweet to below 1% sucrose, interpolated to 0.75% sucrose), assuming an additive effect, would be expected to be isosweet to below 9% sucrose, or below 8.5% sucrose by interpolation.

Furthermore, the enhancer mixture in water was determined to be less sweet than 2.25% sucrose thus the expected isointensity of the mixture in 6% sucrose would be expected to be less than 8.25% sucrose (see example 12G).

However, the determined isointensity was 10% sucrose, which is clearly above a mere additive effect.

Example 11C

Ranking Test of 60 ppm Swingle Extract+60 ppm NarDHC+2 ppm NDHC in 7% Sucrose+0.15% Citric Acid, Determining its Sucrose Isointensity A sample of 60 ppm swingle extract+60 ppm NarDHC+2 ppm NDHC in a solution of 7% sucrose (S)+0.15% citric acid (CA) was evaluated for sweetness isointensity by comparison to sucrose/citric acid solutions 1-4 (corresponding to a pH of about 2.7) as indicated in the table below using the ranking method described in example 3. The results are indicated in the table below.

| solutions | sucrose (S) [% wt/wt] | citric acid (CA) [% wt/wt] | sample sweetness in 7% S and 0.15% CA | R-index [%] | Critical value [%] | p-value |
|---|---|---|---|---|---|---|
| 1 | 7% | 0.105% | sweeter | 98% | 64.61 | P < 0.05 |
| 2 | 8% | 0.12% | sweeter | 81% | 64.61 | P < 0.05 |
| 3 | 9% | 0.135% | sweeter | 68% | 64.61 | P < 0.05 |
| 4 | 10% | 0.15% | less sweet | 33% | 35.39 | P < 0.05 |

An R-index from 68-100%, which is greater than the critical value (64.61%), means that the sample was significantly sweeter than the sucrose/citric acid solutions 1, 2, and 3.

An R-index of 33%, which is below the critical value (35.39%), means that the sample was less sweet than the sucrose/citric acid solution 4 with 10% sucrose and 0.15% citric acid.

The determined sweetness isointensity therefore wasove 9% sucrose/0.135% citric acid, or equivalent to 9.5% sucrose/0.1425% citric acid by interpolation.

As a control, in example 12I, a sample of 60 ppm swingle extract+60 ppm NarDHC+2 ppm NDHC in 0.1425% citric acid/water was determined to be isosweet to 1.5% sucrose/0.1425% CA, reflecting the inherent sweetness of the sample in presence of a similar citric acid concentration. It is known that the lowering of the pH of the solution (in presence of acids, here by CA), decreases the sensitivity to sweetness. Therefore at 0.15% CA the isointensityness due to inherent sweetness would be expected to be even lower.

The determined sweetness isointensity of the sample in 7% sucrose/0.15% CA was equivalent to above 9% sucrose/0.135% citric acid, or equivalent to 9.5% sucrose/0.1425% CA by interpolation, which is clearly above a merely additive effect.

The results show that the sweetness enhancers also work in the presence of acids at a low pH commonly used in many beverages (usually from pH 2.6 to 3).

Example 11D

Ranking Test of 45 ppm Swingle Extract+45 ppm NarDHC+1.5 ppm NDHC in 7% Sucrose, Determining its Sucrose Isointensity A sample of 45 ppm swingle extract+45 ppm NarDHC+1.5 ppm NDHC in 7% sucrose was evaluated for isointensity to sucrose solutions in a concentration of 7-11% using the ranking method described in example 3. The results are indicated in the table below.

| sucrose solutions [% wt/wt] | sample sweetness | R-index [%] | Critical value [%] | p-value |
|---|---|---|---|---|
| 7% | sweeter | 94% | 64.61 | P < 0.05 |
| 8% | sweeter | 81% | 64.61 | P < 0.05 |
| 9% | sweeter | 68% | 64.61 | P < 0.05 |
| 10% | less sweet | 19% | 35.39 | P < 0.05 |
| 11% | less sweet | 6% | 35.39 | P < 0.05 |

An R-index from 68-94%, which is greater than the higher critical value (64.61%), means that the enhancer mixture sample was significantly sweeter than a sucrose sample at a concentration of 7%, 8% and 9%. An R-index of 6-19%, which is less than the lower critical value (35.39%), means the enhancer mixture sample was significantly less sweet than 10% and 11% sucrose. The enhancer mixture sample in 7% sucrose was equivalent in sweetness to above 9% but below 10% sucrose, and to 9.5% sucrose by interpolation. This is a difference of at least +2° Brix (+2.5° Brix by interpolation) to the actual sucrose concentration of 7%.

As an indirect control, a higher concentrated sample (2 ppm NDHC+60 ppm swingle extract+45 ppm NarDHC) was found to be isosweet in sweetness to 1.75% sucrose (see example 12H). Accordingly, the less concentrated enhancer mixture that was tested will be isosweet to a concentration well below 1.75% sucrose. As the effect was determined to be at least +2° Brix (interpolated to 2.5° Brix), at least an added 0.25° Brix (at least 0.75° Brix when interpolated) is due to the enhancement of sucrose by the enhancer mixture, which is clearly above a merely additive effect.

Example 11E

Ranking Test of 1 ppm NDHC+30 ppm Swingle Extract+30 ppm NarDHC in 7% Sucrose, Determining its Sucrose Isointensity A 1 ppm NDHC+30 ppm swingle extract+30 ppm NarDHC in 7% sucrose sample was evaluated for isointensity to sucrose solutions in a concentration of 7-11% using the ranking method described in example 3. The results are indicated in the table below.

| sucrose solution [% wt/wt] | sample sweetness (NDHC + swingle + NarDHC) | R-index [%] | Critical value [%] | p-value |
|---|---|---|---|---|
| 7% | sweeter | 96% | 64.84 | P < 0.05 |
| 8% | sweeter | 68% | 64.84 | P < 0.05 |
| 9% | isosweet | 48% | 35.16 | P < 0.05 |
| 10% | less sweet | 20% | 35.16 | P < 0.05 |
| 11% | less sweet | 4% | 35.16 | P < 0.05 |

An R-index from 68-94%, which is greater than the higher critical value (64.84%), means that the enhancer mixture sample was significantly sweeter than the sucrose sample at 7% and 8%. An R-index of 4-20%, which is less than the lower critical value (35.16%), means the enhancer mixture sample was significantly less sweet than 10% and 11% sucrose. An R-index of 48% is not significantly different from chance (50%). The enhancer mixture was isosweet to 9% sucrose, i.e. perceived as 2% above the actual sucrose concentration.

In the enhancer mixture sample tested (1 ppm NDHC, 30 ppm swingle extract and 30 ppm NarDHC), each ingredient is below its respective threshold for sweet taste.

As an indirect control, a higher concentrated sample (2 ppm NDHC+60 ppm Swingle Extract+45 ppm NarDHC) was found to be isosweet with 1.75% sucrose (see example 12H).

Accordingly, the tested sample of lower concentration can be expected to have an isointensity to sucrose in a concentration well below 1.75% sucrose.

Therefore, there is at least an effect of an added 0.25° Brix sucrose intensity, which is clearly above a merely additive effect Example 11F Ranking Test of 60 ppm Swingle Extract+60 ppm NarDHC+2 ppm NDHC in 140 ppm Sucralose A 60 ppm Swingle Extract+60 ppm NarDHC+2 ppm NDHC in 140 ppm sucralose sample was evaluated in comparison to sucralose solutions in a concentration of 140-220 ppm using the ranking method described in example 3. The results are indicated in the table below.

| sucralose solutions [ppm] | sample sweetness | R-index [%] | Critical value [%] | p-value |
| --- | --- | --- | --- | --- |
| 140 | sweeter | 100% | 64.61 | P < 0.05 |
| 160 | sweeter | 100% | 64.61 | P < 0.05 |
| 180 | sweeter | 98% | 64.61 | P < 0.05 |
| 200 | sweeter | 99% | 64.61 | P < 0.05 |
| 220 | sweeter | 97% | 64.61 | P < 0.05 |

An R-index from 97-100%, which is greater than the higher critical value (64.61%), means that the enhancer mixture sample was significantly sweeter than the sucralose samples at 140, 160, 180, 200 and 220 ppm.

The results show that the sample exceeded the sweetness of 220 ppm sucralose solution. Therefore, the sample allows a reduction of sucralose concentration by at least 36% without a reduction of sweetness.

Example 11G

Ranking Test of 60 ppm Swingle Extract+60 ppm NarDHC+2 ppm NDHC in 367.5 ppm Aspartame A 60 ppm Swingle Extract+60 ppm NarDHC+2 ppm NDHC in 367.5 ppm aspartame sample was evaluated in comparison to sucralose solutions in a concentration of 367.5-577.5 ppm using the ranking method described in example 3. The results are indicated in the table below.

| Aspartame solutions [ppm] | sample sweetness | R-index [%] | Critical value [%] | p-value |
| --- | --- | --- | --- | --- |
| 367.5 | sweeter | 100% | 64.61 | P < 0.05 |
| 420 | sweeter | 100% | 64.61 | P < 0.05 |
| 472.5 | sweeter | 98% | 64.61 | P < 0.05 |
| 525 | sweeter | 97% | 64.61 | P < 0.05 |
| 577.5 | sweeter | 95% | 64.61 | P < 0.05 |

An R-index from 95-100%, which is greater than the higher critical value (64.61%), means that the enhancer mixture sample was significantly sweeter than the aspartame samples at 367.5, 420, 472.5, 525 and 577.5 ppm.

The results show that the sample exceeded the sweetness of 577.5 ppm aspartame.

Therefore, the sample allows a reduction of aspartame concentration by at least 36% without a reduction of sweetness.

Example 11H

Ranking Test of 60 ppm Swingle Extract+60 ppm NarDHC+2 ppm NDHC in 560 ppm AceK

A 60 ppm Swingle extract+60 ppm NarDHC+2 ppm NDHC in 560 ppm AceK sample was evaluated in comparison to AceK solutions in a concentration of 560-880 ppm using the ranking method described in example 3. The results are indicated in the table below.

| AceK solutions [ppm] | sample sweetness | R-index [%] | Critical value [%] | p-value |
| --- | --- | --- | --- | --- |
| 560 | sweeter | 95% | 64.61 | P < 0.05 |
| 640 | sweeter | 93% | 64.61 | P < 0.05 |
| 720 | sweeter | 90% | 64.61 | P < 0.05 |
| 800 | sweeter | 92% | 64.61 | P < 0.05 |
| 880 | sweeter | 87% | 64.61 | P < 0.05 |

An R-index from 87-95%, which is greater than the higher critical value (64.61%), means that the enhancer mixture sample was significantly sweeter than the AceK samples at 560, 640, 720, 800 and 880 ppm.

The results show that the sample exceeds the sweetness of 880 ppm AceK.

Therefore, the sample allows a reduction of AceK concentration by at least 36% without a reduction of sweetness.

Examples 12A-12I

Controls

Determination of Sweetness Intensity of Sweetness Enhancers in Water

To exclude the slightly sweet taste of extracts/compounds as such, or an enhancement effect between different sweetness enhancers rather than sweetness enhancers and sucrose, the following controls were performed.

To determine the sweetness intensity, either a forced choice test as described in example 2 was performed, or the isointensity to sucrose was determined in a ranking test as described in example 3b.

Example 12A

Sweetness of NarDHC in water a. Ranking Test of 45 ppm NarDHC in Water, Determining its Sucrose Isointensity A 45 ppm NarDHC in water sample was evaluated for isointensity to sucrose solutions in a concentration of 0.5-1% using the ranking method described in example 3. The results are indicated in the table below.

| sucrose solution [% wt/wt] | sample sweetness (NarDHC, 45 ppm) | R-index [%] | Critical value [%] | p-value |
|---|---|---|---|---|
| 0.5% | Isosweet | 56% | 64.61 | P < 0.05 |
| 1% | less sweet | 14% | 35.39 | P < 0.05 |

An R-index 56%, which is below the critical value (64.61), means that the NarDHC sample is isosweet to 0.5%. An R-index of 14%, which is below the critical value (35.39%), means the NarDHC sample was significantly less sweet than 1% sucrose.

b. Ranking Test of 60 ppm NarDHC in Water, Determining its Sucrose Isointensity

A 60 ppm NarDHC in water sample was evaluated for isointensity to sucrose solutions in a concentration of 0.5-1.5% using the ranking method described in example 3. The results are indicated in the table below.

| sucrose solutions [% wt/wt] | sample sweetness (NarDHC, 60 ppm) | R-index [%] | Critical value [%] | p-value |
|---|---|---|---|---|
| 0.5% | sweeter | 99% | 64.61 | P < 0.05 |
| 1% | sweeter | 71% | 64.61 | P < 0.05 |
| 1.5% | less sweet | 20% | 35.39 | P < 0.05 |

An R-index 99% and 71%, which is above the critical value (64.61), means that the NarDHC sample was more sweet than 0.5% or 1% sucrose. An R-index of 20%, which is below the critical value (35.39%), means the NarDHC sample was significantly less sweet than 1.5% sucrose By interpolation, the sweetness of 60 ppm NarDHC was equivalent to about 1.25% sucrose.

c. Paired Comparison of 45 ppm, 50 ppm, 55 ppm and 60 ppm NarDHC in Water Versus 0%, 0.5%, 1% or 1.5% Sucrose A NarDHC (45 ppm, 50 ppm, 55 ppm, 60 ppm) in water sample was evaluated for isointensity to sucrose solutions in a concentration of 0-1.5% using a modified version of paired comparison method described in example 4. The NarDHC sample was compared to either 0%, 0.5%, 1% or 1.5% sucrose. The results are indicated in the table below.

| NarDHC [ppm] | Result of comparison | Sucrose [% wt/wt] |
|---|---|---|
| 45 | weakly sweeter | 0 |
| 45 | isosweet | 0.5 |
| 45 | less sweet | 1 |
| 50 | notably sweeter | 0.5 |
| 50 | less sweet | 1 |
| 55 | notably sweeter | 0.5 |
| 55 | isosweet | 1 |
| 60 | notably sweeter | 1 |
| 60 | significantly less sweet | 1.5 |

The 45 ppm solution of NarDHC was weakly sweeter when compared to the 0% sucrose and isosweet to the sweetness of 0.5% sucrose. The 50 ppm NarDHC sample was notably sweeter than 0.5% sucrose but was found to be less sweet than 1% sucrose. The 55 ppm NarDHC sample was notably sweeter than 0.5% sucrose and determined to be isosweet to the sweetness of 1% sucrose. The 60 ppm NarDHC sample was notably sweeter than 1% sucrose but significantly less sweet than 1.5% sucrose.

Example 12B

Sweetness of Rubus Extract in Water

Forced Choice Test of 60 ppm 70% Rubus Extract in Water Versus 1% and 0% Sucrose A forced choice sensory evaluation of rubusoside as a sweetener was performed as described in example 2 subject to the following modifications: 60 ppm rubus extract, comprising 70% rubusoside by weight, in water was compared to either 0% sucrose/water (comparison+rating 1) or 1% sucrose (comparison+rating 2).

The 60 ppm rubus extract was close to the threshold concentration for its sweet perception and significantly less sweet than the weakly sweet 1% sucrose, as shown by the results indicated in the tables below.

| comparison | Sucrose [c] | Number panelists choosing rubus extract in water as sweeter | Number panelists choosing 0% or 1% sucrose as sweeter | Significance level (forced choice) |
|---|---|---|---|---|
| 1 | 0% | 30/30 | 0/30 | p < 0.001 |
| 2 | 1% | 2/30 | 28/30 | p < 0.001 |

| Rating | rating rubus extract in water | rating 0% sucrose | rating 1% sucrose | Significance level (ratings) |
|---|---|---|---|---|
| 1 | 0.4 ± 0.0 | 0.1 ± 0.02 | | p < 0.001 |
| 2 | 0.56 ± 0.07 | | 0.81 ± 0.08 | p < 0.001 |

The 60 ppm rubus extract sample in water was perceived as sweeter than 0% sucrose/water by all panelists (30 of 30 panelists, with a statistical significance level for the forced choice of p<0.001). The low sweetness intensity rating of 0.4 reflects the very weak perceivable sweetness (compare the 0% sucrose negative control with a rating of 0.1. The highest imaginable sweetness rates as 10).

The vast majority of panelists (28 of 30) selected the weakly sweet 1% sucrose solution as being sweeter than the rubus extract solution with a statistical significance level for the forced choice of p<0.001.

The low sweetness intensity rating of 0.56 for rubus extract in water versus 0.81 for 1% sucrose reflects the very weak perceivable sweetness of 60 ppm rubus extract which was significantly less than the sweetness of 1% sucrose.

Example 12C

Sweetness of Swingle Extract in Water

Forced Choice Test of 60 ppm Swingle Extract in Water Versus 0%, 0.5% and 1% Sucrose A forced choice sensory evaluation of swingle extract as a sweetener was performed as described in example 2, subject to the following modifications: Swingle extract had a concentration of 60 ppm in water and was compared to either 0% sucrose/water or 1% sucrose. The results are indicated in the tables below.

| comparison | Sucrose [% wt/wt] | Number panelists choosing swingle in water as sweeter | Number panelists choosing 0% or 1% sucrose as sweeter | Significance level (forced choice) |
|---|---|---|---|---|
| 1 | 0 | 30/30 | 0/30 | p < 0.001 |
| 2 | 0.5 | 28/30 | 2/30 | p < 0.001 |
| 3 | 1 | 6/30 | 24/30 | p < 0.001 |

| Rating | swingle in water | 0% sucrose | 1% sucrose | Significance level |
|---|---|---|---|---|
| 1 | 0.63 ± 0.09 | 0.1 ± 0.04 | | p < 0.001 |
| 2 | 0.58 ± 0.06 | | 0.72 ± 0.06 | p < 0.001 |

The 60 ppm swingle extract was close to the threshold concentration for its sweet perception and significantly less sweet than the weakly sweet 1% sucrose.

The 60 ppm swingle sample in water was perceived as sweeter than 0% sucrose/water by all panelists (30 of 30 panelists, with a statistical significance level for the forced choice of p<0.001). The low sweetness intensity rating of 0.63 reflects the very weak perceivable sweetness (compare the 0% sucrose with a rating of 0.1. The highest imaginable sweetness rates as 10).

The 60 ppm swingle sample in water was perceived as sweeter than 0.5% sucrose/water by a vast majority of the panelists (28 of 30 panelists, with a statistical significance level for the forced choice of p<0.001).

The large majority of panelists (24 of 30) selected the weakly sweet 1% sucrose solution as being sweeter than the 60 ppm swingle extract solution with a statistical significance level for the forced choice of p<0.001.

The low sweetness intensity rating of 0.58 for swingle extract in water versus 0.72 for 1% sucrose reflects the very weak perceivable sweetness of 60 ppm swingle which was significantly less than the sweetness of 1% sucrose.

By interpolation, the sweetness of 60 ppm swingle extract was equivalent to about 0.75% sucrose.

Example 12D

Sweetness of Rebaudioside A in Water a. Paired Comparison of 1-30 ppm Rebaudioside A Versus 0-1.5% Sucrose Rebaudioside A (1 ppm, 10 ppm, 20 ppm, 30 ppm) in water samples was evaluated for isointensity to sucrose solutions in a concentration of 0-1.5% using a modified version of paired comparison method described in example 4. The rebaudioside A samples were compared to either 0%, 0.5%, 1% or 1.5% sucrose. The results are indicated in the table below.

| Rebausioside A [ppm] | Result of comparison | Sucrose [% wt/wt] |
|---|---|---|
| 1 | isosweet | 0 |
| 10 | weakly sweeter | 0 |
| 10 | notably less sweet | 0.5 |
| 20 | notably sweeter | 0.5 |
| 20 | less sweet | 1 |
| 30 | isosweet | 1 |
| 30 | significantly less sweet | 1.5 |

The 1 ppm solution of rebaudioside A had no detectable difference to the 0% sucrose control. The 10 ppm rebaudioside A sample was sweeter than 0% sucrose but was found to be only weakly sweeter than 0.5% sucrose, which is barely detectably sweet. The 20 ppm rebaudioside A sample was notably sweeter than 0.5% sucrose and less sweet than 1% sucrose, which is weakly sweet. Accordingly, the 20 ppm rebaudioside A sample was isosweet to 0.75% sucrose by interpolation. The 30 ppm rebaudioside A sample was isosweet to 1% sucrose and significantly less sweet than 1.5% sucrose.

b. Ranking Test of 20 ppm Rebaudioside A in Water, Determining its Sucrose Isointensity A 20 ppm Rebaudioside A in water sample was evaluated for isointensity to sucrose solutions in a concentration of 0.5-1.5% using the ranking method described in example 3. The results are indicated in the table below.

| sucrose solutions [% wt/wt] | sample sweetness (RedA, 20 ppm) | R-index [%] | Critical value [%] | p-value |
|---|---|---|---|---|
| 0.5% | sweeter | 84% | 64.61 | P < 0.05 |
| 1% | less sweet | 12% | 35.39 | P < 0.05 |
| 1.5% | less sweet | 0% | 35.39 | P < 0.05 |

An R-index 84%, which is above the critical value (64.61), means that the rebaudioside A sample was more sweet than 0.5% sucrose. An R-index of 0% or 12%, which is below the critical value (35.39%), means the rebaudioside A sample was significantly less sweet than 1% or 1.5% sucrose.

By interpolation, the sweetness of 20 ppm rebaudioside was equivalent to about 0.75% sucrose.

Example 12E

Sweetness of Stevioside in Water

Paired Comparison of 20-60 ppm Stevioside Versus 0%-1.5% Sucrose

Stevioside (20 ppm, 30 ppm, 40 ppm, 50 ppm, 60 ppm) in water samples were evaluated for isointensity to sucrose solutions in a concentration of 0-1.5% using a modified version of paired comparison method described in example 4. The stevioside samples were compared to either 0%, 0.5%, 1% or 1.5% sucrose. The results are indicated in the table below.

| Stevioside [ppm] | Result of comparison | Sucrose [% wt/wt] |
|---|---|---|
| 20 | weakly sweeter | 0 |
| 20 | notably less sweet | 0.5 |
| 30 | weakly sweeter | 0 |
| 30 | isosweet | 0.5 |

-continued

| Stevioside [ppm] | Result of comparison | Sucrose [% wt/wt] |
|---|---|---|
| 30 | significantly less sweet | 1 |
| 40 | notably sweeter | 0.5 |
| 40 | less sweet | 1 |
| 50 | sweeter | 0.5 |
| 50 | isosweet | 1 |
| 50 | significantly less sweet | 1.5 |
| 60 | notably sweeter | 1 |
| 60 | less sweet | 1.5 |

The 20 ppm stevioside sample was sweeter than 0% sucrose but less sweet than 0.5% sucrose, which was barely detectably sweet. The 30 ppm stevioside sample was weakly sweeter than 0% sucrose and determined to be isosweet to 0.5% sucrose. The 40 ppm stevioside sample was notably sweeter than 0.5% sucrose and less sweet than 1% sucrose. Accordingly, the 40 ppm stevioside sample was isosweet to 0.75% sucrose by interpolation. The 50 ppm stevioside sample was isosweet to 1% sucrose and significantly less sweet than 1.5% sucrose. The 60 ppm stevioside sample was notably sweeter than 1% sucrose and less sweet than 1.5% sucrose. Accordingly, the 60 ppm stevioside sample was determined to be isosweet to 1.25% sucrose by interpolation.

Example 12F

Sweetness of NDHC in Water

Ranking Test of 2 ppm NDHC in Water, Determining its Sucrose Isointensity

A 2 ppm NDHC in water sample was evaluated for its isointensity to sucrose solutions in a concentration of 0.5-1% using the ranking method described in example 3b. The results are indicated in the table below.

| sucrose solutions [% wt/wt] | NDHC sample sweetness | R-index [%] | Critical value [%] | p-value |
|---|---|---|---|---|
| 0.5% | isosweet | 41% | 35.39 | P < 0.05 |
| 1% | less sweet | 5% | 35.39 | P < 0.05 |

An R-index 41%, which is not significantly above the critical value (35.39%), means that the NDHC sample was isosweet to 0.5% sucrose. An R-index of 5%, which is below the critical value (35.39%), means the NDHC sample was significantly less sweet than 1% sucrose.

Example 12G

Sweetness of Sweetness Enhancer Mixtures and NDHC in Water

Forced Choice Test of 60 ppm Swingle Extract+60 ppm NarDHC+2 ppm NDHC in Water Versus 2.25% Sucrose A forced choice test of a mixture of swingle extract, NarDHC, and NDHC was performed as described in example 2 subject to the following modifications: A 60 ppm swingle extract+60 ppm NarDHC+2 ppm NDHC in water sample was compared to 2.25% sucrose. The 2.25% sucrose concentration was selected to be slightly less than the interpolated added individual effects of the sweetness isointensities to sucrose of each sweetness enhancer:

0.5% for 2 ppm NDHC (example 12F)+0.75% for 60 ppm swingle extract (example 12C)+1.25% for 60 ppm NarDHC (control example 12A).

The 2 ppm NDHC+60 ppm swingle extract+60 ppm NarDHC was significantly less sweet than 2.25% sucrose, as shown in the table below.

This result shows that the mixture of sweetness enhancers in water (without addition of sucrose) was below the summed-up sweetness of each ingredient. Further it is noted that the sweetness enhancers as such do not enhance each other's inherent sweetness to any great extent.

| Sucrose [% wt/wt] | Number of panelists choosing sample as sweeter | Number of panellists choosing 2.25% sucrose as sweeter | Significance level (forced choice) |
|---|---|---|---|
| 2.25 | 9/30 | 21/30 | p = 0.023 |

Example 12H

Mixtures—Control

Forced Choice Test of 2 ppm NDHC+60 Ppm Swingle Extract+45 ppm NarDHC in Water Versus 1.75% Sucrose A forced choice test of an enhancer mixture sample of NDHC, swingle extract and NarDHC was performed as described in example 2 subject to the following modifications:

2 ppm NDHC+60 ppm swingle extract+45 ppm NarDHC in water was compared to 1.75% sucrose. The 1.75% sucrose concentration was selected based on adding the sweetness of the individual ingredients: 0.5% for 2 ppm NDHC (example 12F)+0.75% for 60 ppm swingle extract (example 12C)+0.5% for 45 ppm NarDHC (example 12A).

The enhancer mixture sample was isosweet to the sweetness of 1.75% sucrose, as shown by the statistically non-significant selection (which indicates choice purely by chance) of the sucrose solution as being sweeter in the results indicated in the table below.

Furthermore, this result shows that the sweetness of the combination of the enhancer mixture sample was at best additive without the addition of sucrose to the solution.

| Sucrose [% wt/wt] | Number of panelists choosing sample as sweeter | Number of panellists choosing 1.75% sucrose as sweeter | Significance level (forced choice) |
|---|---|---|---|
| 1.75 | 12/30 | 18/30 | p = 0.008 |

Example 12I

Sweetness of Sweetness Enhancer Mixtures and NDHC in Acid/Water

Ranking Test of 60 ppm Swingle Extract+60 ppm NarDHC+2 ppm NDHC in 0.1425% Citric/Water, Determining its Sucrose Isointensity A sample of 60 ppm swingle extract+60 ppm NarDHC+2 ppm NDHC in 0.1425% citric acid/water and 0% sucrose was evaluated for its isointensity to sucrose solutions in a concentration of 0%, 1.5% and 2.5% each containing citric acid at 0.1425% using the ranking method described in example 3b. The results are indicated in the table below.

| sucrose solutions [% wt/wt] | sample sweetness | R-index [%] | Critical value [%] | p-value |
|---|---|---|---|---|
| 0% | sweeter | 97% | 64.61 | P < 0.05 |
| 1.5% | isosweet | 56% | 64.61 | P < 0.05 |
| 2.5% | less sweet | 7% | 35.39 | P < 0.05 |

An R-index 97%, which is significantly above the critical value (64.61%), means that the mixture in 0.1425% citric acid was sweeter than 0% sucrose in 0.1425% citric acid. An R-index of 56%, which is not significantly different than the critical value (64.61%), means the mixture in 0.1425% citric acid was isosweet with 1.5% sucrose in 0.1425% citric acid.

An R-index 7%, far below the critical value (35.39%), means the mixture in 0.1425% citric acid was less sweet than 2.5% sucrose+0.1425% citric acid.

The results show an isointensity in sweetness of the sample comprising the sweetness enhancer mixture to 1.5% sucrose at a concentration of 0.1425% citric acid, showing its inherent sweetness at that citric acid concentration and corresponding pH (sweetness intensity is pH dependent).

While the sweet enhancing formulations and sweetened consumables have been described above in connection with certain illustrative embodiments, it is to be understood that other similar embodiments may be used or modifications and additions may be made to the described embodiments for performing the same function. Further, all embodiments disclosed are not necessarily in the alternative, as various embodiments may be combined to provide the desired characteristics. Variations can be made by one having ordinary skill in the art without departing from the spirit and scope of the disclosure. Therefore, the sweetness enhancing formulations and sweetened consumables should not be limited to any single embodiment, but rather construed in breadth and scope in accordance with the recitation of the attached claims.

The invention claimed is:

1. A sweetened consumable comprising
   a) at least 0.0001% of at least one sweetener,
      wherein said sweetener includes sucrose, fructose, glucose, high fructose corn syrup, corn syrup, xylose, arabinose, rhamnose, xylitol, mannitol, sorbitol, inositol, acesulfame potassium, aspartame, neotame, sucralose, saccharine, or combinations thereof,
      wherein said at least one sweetener or sweetener combination is present in a concentration above the sweetness detection threshold in a concentration isosweet to 2% to 15% sucrose, and
   b) a sweetness enhancer comprising (i) mogroside V or swingle extract and (ii) rebaudioside A, wherein the sweetness enhancer is present in a concentration near its sweetness detection threshold, wherein for mogroside V this concentration is from 0.4 to 12.5 ppm, wherein for swingle extract this concentration is from 2 to 60 ppm, and wherein for rebaudioside A this concentration is from 1 to 30 ppm;
      wherein the sweetness enhancer has a sweetness enhancing effect that is greater than the sweet taste due to the sweetness enhancer itself.

2. The sweetened consumable of claim 1, wherein said sweetness enhancer comprises mogroside V and rebaudioside A.

3. The sweetened consumable of claim 1, wherein said sweetness enhancer comprises mogroside V, rebaudioside A and stevioside, wherein stevioside is present in a concentration near its sweetness detection threshold of 2 to 60 ppm.

4. The sweetened consumable of claim 1, wherein said sweetness enhancer comprises swingle extract and rebaudioside A.

5. The sweetened consumable of claim 1, wherein said sweetness enhancer comprises swingle extract, rebaudioside A and stevioside, wherein stevioside is present in a concentration near its sweetness detection threshold of 2 to 60 ppm.

6. The sweetened consumable of claim 1, comprising a beverage.

7. A method of sweetening consumables utilizing
   a) at least 0.0001% of at least one sweetener,
      wherein said sweetener includes sucrose, fructose, glucose, high fructose corn syrup, corn syrup, xylose, arabinose, rhamnose, xylitol, mannitol, sorbitol, inositol, acesulfame potassium, aspartame, neotame, sucralose, saccharine, or combinations thereof,
      wherein said at least one sweetener or sweetener combination is present in a concentration above the sweetness detection threshold in a concentration isosweet to 2% to 15% sucrose, and
   b) a sweetness enhancer comprising (i) mogroside V or swingle extract and (ii) rebaudioside A, wherein the sweetness enhancer is present in a concentration near its sweetness detection threshold, wherein for mogroside V this concentration is from 0.4 to 12.5 ppm, wherein for swingle extract this concentration is from 2 to 60 ppm, and wherein for rebaudioside A this concentration is from 1 to 30 ppm;
      which are admixed to a consumable,
      wherein the sweetness enhancer has a sweetness enhancing effect that is greater than the sweet taste due to the sweetness enhancer itself.

8. The method of claim 7, wherein said sweetness enhancer comprises mogroside V and rebaudioside A.

9. The method of claim 7, wherein said sweetness enhancer comprises mogroside V, rebaudioside A and stevioside, wherein stevioside is present in a concentration near its sweetness detection threshold of 2 to 60 ppm.

10. The method of claim 7, wherein said sweetness enhancer comprises swingle extract and rebaudioside A.

11. The method of claim 7, wherein said sweetness enhancer comprises swingle extract, rebaudioside A and stevioside, wherein stevioside is present in a concentration near its sweetness detection threshold of 2 to 60 ppm.

12. The method of claim 7, wherein said consumable comprises a beverage.

13. The sweetened consumable of claim 3, comprising a beverage.

14. The sweetened consumable of claim 5, comprising a beverage.

15. The method of claim 9, wherein said consumable comprises a beverage.

16. The method of claim 11, wherein said consumable comprises a beverage.

* * * * *